(12) United States Patent
Lim et al.

(10) Patent No.: US 8,149,923 B2
(45) Date of Patent: Apr. 3, 2012

(54) IMAGE DECODING METHOD, IMAGE CODING METHOD, IMAGE DECODING APPARATUS, AND IMAGE CODING APPARATUS

(75) Inventors: Chong Soon Lim, Singapore (SG); Takahiro Nishi, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/900,824

(22) Filed: Oct. 8, 2010

(65) Prior Publication Data
US 2011/0019746 A1 Jan. 27, 2011

Related U.S. Application Data

(63) Continuation of application No. PCT/JP2010/003041, filed on Apr. 28, 2010.

(60) Provisional application No. 61/173,380, filed on Apr. 28, 2009.

(51) Int. Cl.
*H04N 7/12* (2006.01)
*H04N 11/02* (2006.01)
*H04N 11/04* (2006.01)
*H04B 1/66* (2006.01)

(52) U.S. Cl. .............................. 375/240.25

(58) Field of Classification Search ........ 375/240–240.29
See application file for complete search history.

(56) References Cited

U.S. PATENT DOCUMENTS

| | | | | |
|---|---|---|---|---|
| 7,415,069 B2 * | 8/2008 | Winger | .............. | 375/240.25 |
| 7,742,524 B2 * | 6/2010 | Jeon et al. | .............. | 375/240.13 |
| 2008/0317124 A1 * | 12/2008 | Cho et al. | .............. | 375/240.08 |
| 2009/0225826 A1 | 9/2009 | Pandit et al. | | |
| 2009/0296826 A1 | 12/2009 | Pandit et al. | | |
| 2010/0020871 A1 * | 1/2010 | Hannuksela et al. | ..... | 375/240.12 |
| 2010/0046619 A1 * | 2/2010 | Koo et al. | .............. | 375/240.12 |

FOREIGN PATENT DOCUMENTS

| | | |
|---|---|---|
| WO | 2007/126509 | 11/2007 |
| WO | 2008/085909 | 7/2008 |

OTHER PUBLICATIONS

International Search Report issued Jun. 8, 2010 in corresponding International Application No. PCT/JP2010/003041.

Written Opinion of the International Searching Authority issued Jun. 8, 2010 in corresponding International Application No. PCT/JP2010/003041.

(Continued)

*Primary Examiner* — Nhon Diep
(74) *Attorney, Agent, or Firm* — Wenderoth, Lind & Ponack, L.L.P.

(57) ABSTRACT

To provide an image decoding method allowing decoding of a multiview video even when no prefix NAL units are used. The image decoding method includes: parsing NAL units of a base view; decoding an image of the base view; parsing MVC extension parameters of a non-base view; searching whether or not prefix NAL units for a base view are present; either computing MVC extension parameters for the base view when no prefix NAL units are present or parsing the MVC extension parameters of the base view when prefix NAL units for the base view are present; and decoding the non-base view using the MVC extension parameters of the base view and the MVC extension parameters of the non-base view.

2 Claims, 23 Drawing Sheets

OTHER PUBLICATIONS

Anthony Vetro et al., "Joint Draft 1.0 on Multiview Video Coding", Joint Video Team (JVT) of ISO/IEC MPEG & ITU-T VCEG 21$^{st}$ Meeting [JVT-U209], Hangzhou, China, Oct. 2006, pp. 1-20.

Anthony Vetro et al., "Joint Draft 5.0 on Multiview Video Coding", Joint Video Team (JVT) of ISO/IEC MPEG & ITU-T VCEG 25$^{th}$ Meeting [JVT-Y209], Shenzhen, China, Oct. 2007, pp. 1-13.

Anthony Vetro et al., "Joint Draft 2.0 on Multiview Video Coding", Joint Video Team (JVT) of ISO/IEC MPEG & ITU-T VCEG 22$^{nd}$ Meeting [JVT-V209], Marrakech, Morocco, Jan. 2007, p. 1.

Ye-Kui Wang et al., "System and Transport Interface of the Emerging SVC Standard", Joint Video Team (JVT) of ISO/IEC MPEG & ITU-T VCEG 21$^{st}$ Meeting [JVT-U151], Hangzhou, China, Oct. 2006, pp. 1-17.

Thomas Wiegand et al., "Meeting Report, Draft 7", Joint Video Team (JVT) of ISO/IEC MPEG & ITU-T VCEG 22$^{nd}$ Meeting [AgendaWithNotesVd7], Marrakech, Morocco, Jan. 2007, pp. 1 and 34.

"Advanced video coding for generic audiovisual services", Series H: Audiovisual and Multimedia Systems Infrastructure of audiovisual services—Coding of moving video, ITU-T Telecommunication Standardization Sector of ITU, H.264, Mar. 2009, pp. 1-647.

* cited by examiner

IMAGE DECODING METHOD, IMAGE CODING METHOD, IMAGE DECODING APPARATUS, AND IMAGE CODING APPARATUS

CROSS REFERENCE TO RELATED APPLICATION

This is a continuation application of PCT application No. PCT/JP2010/003041, filed on Apr. 28, 2010, designating the United States of America, which claims the benefit of U.S. Provisional Application No. 61/173,380, filed on Apr. 28, 2009.

BACKGROUND OF THE INVENTION (1) Field of the Invention

The present invention relates to image decoding methods of decoding multiview video, image decoding apparatuses which decode multiview video, image coding methods of coding multiview video, and image coding apparatuses which code multiview video.

(2) Description of the Related Art

Multiview Video Coding (MVC) standard is defined as an extension of ISO/IEC 14496-10 Advanced Video Coding (AVC) standard. The profiles created in the MVC standard are designed to be backward compatible to some of the profiles defined in the AVC standards. In another words, the decoders or players conforming to the new MVC profiles are capable of decoding some of bitstreams conforming to the AVC profiles. Vice versa, legacy decoders of the AVC profiles (particularly, the High profile) should also decode at least one of the views in bitstreams conforming to the new MVC profiles.

In the Multiview Video Coding (MVC) standard, as a coded base view is required to be compatible with the profiles defined by the AVC standard, a legacy decoder conforming to the High Profile of the AVC standard should be capable of decoding the base view in an MVC bitstream conforming to the MVC profiles. The coded view is contained in Network Abstraction Layer (NAL) units. NAL units of different types are differentiated by NAL unit type values. A non-base view is contained in NAL units having a NAL unit type value reserved in the previous versions of the AVC standard. Thus, the NAL units should be ignored by a legacy high profile decoder.

However, in the MVC standard, a particular NAL unit called a prefix NAL unit is required to be located before each of NAL units for a coded base view and sent together with the NAL unit. This prefix NAL unit has a NAL unit type value of 14 and is reserved in the previous versions of the AVC standard. A NAL unit for a coded base view shall either have a NAL unit type value of 5 or 1.

The prefix NAL unit contains additional parameters that are located in the MVC extension part of a NAL unit header. These parameters are associated with a base view, and are used in the encoding and decoding processes of a corresponding non-base view. FIG. 23 is a diagram on the location of NAL unit header MVC extension syntaxes. The parameters in the NAL unit header MVC extension part include a non-IDR flag (non_idr_flag), a priority ID (priority_id), a view ID (view_id), a temporal ID (temporal_id), an anchor picture flag (anchor_pic_flag), an inter-view prediction flag (inter_view_flag), and a reserved 1-bit (reserved_one_bit). The reserved 1-bit (reserved_one_bit) has a value, and is not used for the encoding and decoding processes of a non-base view.

Patent Reference 1 (International Patent Application Publication No. WO2007/126509) discloses a technique of coding multiview video using NAL units.

Ideally, legacy AVC decoders should ignore NAL units having NAL unit type values defined as values reserved in the previous versions of the AVC specification. Legacy AVC decoders should decode only the NAL units for base views and reconstruct only the base views.

However, not all decoders in the market will ignore these NAL units having reserved values. A compressed base view and a compressed non-base view can be separated using different stream identifiers. However, as it is required to include prefix NAL units associated with the compressed base view, some decoders in the market cannot decode the base view due to the prefix NAL units. This creates problems in supporting backward compatibility of compressed MVC streams on legacy AVC decoders.

In addition, a prefix NAL unit must be located before each of the NAL units of a base view. Accordingly, it is not easy to add a new view to a bitstream that represents only a single view and does not include prefix NAL units. In other words, it is difficult to modify a bitstream generated based on a conventional standard to a bitstream representing a multiview video. Therefore, it was difficult to utilize a conventional bitstream generated based on such a conventional standard as a view in a multiview video.

Considering this, the present invention has an object to provide image coding methods allowing coding of multiview video and/or image decoding methods allowing decoding of multiview video even when no prefix NAL units are used.

SUMMARY OF THE INVENTION

In order to solve the aforementioned problems, an image decoding method according to the present invention is for decoding a multiview video, and includes: parsing NAL units including an image included in view components of a base view; decoding the image included in the view components of the base view; parsing NAL unit header MVC extension parameters of a non-base view; searching the view components of the base view for prefix NAL units; computing NAL unit header MVC extension parameters for the base view when no prefix NAL units are present in the view components of the base view; parsing, when prefix NAL units are present in the view components of the base view, the NAL unit header MVC extension parameters of the base view, with reference to the prefix NAL units; parsing NAL units including an image included in view components of the non-base view; and decoding the image included in the view components of the non-base view, using (i) the computed or parsed NAL unit header MVC extension parameters of the base view and (ii) the parsed NAL unit header MVC extension parameters of the non-base view.

In this way, a multiview video is decoded even when no prefix NAL units are used.

In addition, each of the base view and the non-base view may be assigned with the NAL unit header MVC extension parameters including a non-IDR flag (non_idr_flag), a priority ID (priority_id), a view ID (view_id), a temporal ID (temporal_id), an anchor picture flag (anchor_pic_flag), and an inter-view prediction flag (inter_view_flag).

In this way, a non-base view is decoded using various parameters.

In addition, the computing NAL unit header MVC extension parameters for the base view may include: obtaining a value of the non-IDR flag (non_idr_flag) from among the NAL unit header MVC extension parameters of the non-base view; assigning the value of the non-IDR flag (non_idr_flag) obtained from among the NAL unit header MVC extension parameters of the non-base view to the non-IDR flag (non_idr_flag) included in the NAL unit header MVC extension parameters of the base view; assigning a first predefined value to the priority ID (priority_id) included in the NAL unit header MVC extension parameters of the base view; assigning a second predefined value to the view ID (view_id) included in the NAL unit header MVC extension parameters of the base view; obtaining a value of the temporal ID (temporal_id) from among the NAL unit header MVC extension parameters of the non-base view; assigning the value of the temporal ID (temporal_id) obtained from among the NAL unit header MVC extension parameters of the non-base view to the temporal ID (temporal_id) included in the NAL unit header MVC extension parameters of the base view; obtaining a value of the anchor picture flag (anchor_pic_flag) from among the NAL unit header MVC extension parameters of the non-base view; assigning the value of the anchor picture flag (anchor_pic_flag) obtained from among the NAL unit header MVC extension parameters of the non-base view to the anchor picture flag (anchor_pic_flag) included in the NAL unit header MVC extension parameters of the base view; and assigning a third predefined value to the inter-view prediction flag (inter_view_flag) included in the NAL unit header MVC extension parameters of the base view.

In this way, NAL unit header MVC extension parameters of a base view are specifically computed.

In addition, the computing NAL unit header MVC extension parameters for the base view may include: obtaining a value of a NAL unit type (nal_unit_type) from among NAL unit headers of the base view; assigning 0 to the non-IDR flag (non_idr_flag) included in the NAL unit header MVC extension parameters of the base view if the value of the NAL unit type (nal_unit_type) is 5; assigning 1 to the non-IDR flag (non_idr_flag) included in the NAL unit header MVC extension parameters of the base view if the value of the NAL unit type (nal_unit_type) is 1; assigning a first predefined value to the priority ID (priority_id) included in the NAL unit header MVC extension parameters of the base view; assigning a second predefined value to the view ID (view_id) included in the NAL unit header MVC extension parameters of the base view; obtaining a value of the temporal ID (temporal_id) from among the NAL unit header MVC extension parameters of the non-base view; assigning the value of the temporal ID (temporal_id) obtained from among the NAL unit header MVC extension parameters of the non-base view to the temporal ID (temporal_id) included in the NAL unit header MVC extension parameters of the base view; obtaining a value of the anchor picture flag (anchor_pic_flag) from among the NAL unit header MVC extension parameters of the non-base view; assigning the value of the anchor picture flag (anchor_pic_flag) obtained from among the NAL unit header MVC extension parameters of the non-base view to the anchor picture flag (anchor_pic_flag) included in the NAL unit header MVC extension parameters of the base view; and assigning a third predefined value to the inter-view prediction flag (inter_view_flag) included in the NAL unit header MVC extension parameters of the base view.

In this way, NAL unit header MVC extension parameters for a base view are specifically computed. In addition, the use of the NAL unit headers of a base view makes it possible to compute more precise values.

In addition, the first predefined value assigned to the priority ID (priority_id) may be 0.

In this way, a base view is handled preferentially.

In addition, the second predefined value assigned to the view ID (view_id) may be 0.

In this way, the view ID (view_id) of a base view is a distinguishable fixed value.

In addition, the third predefined value assigned to the inter-view prediction flag (inter_view_flag) may be 1.

In this way, a decoded image of a base view can be used for inter-view prediction.

In addition, an image coding method is for coding a multiview video, and may include: coding an image of a base view; writing view components including the coded image of the base view into NAL units without using prefix NAL units; determining NAL unit header MVC extension parameters of a non-base view; computing NAL unit header MVC extension parameters for the base view; coding an image of the non-base view, using the computed NAL unit header MVC extension parameters of the base view and the determined NAL unit header MVC extension parameters of the non-base view; and writing view components including the coded image of the non-base view into NAL units.

In this way, a multiview video is coded without using prefix NAL units.

In addition, each of the base view and the non-base view may be assigned with the NAL unit header MVC extension parameters including a non-IDR flag (non_idr_flag), a priority ID (priority_id), a view ID (view_id), a temporal ID (temporal_id), an anchor picture flag (anchor_pic_flag), and an inter-view prediction flag (inter_view_flag).

In this way, a non-base view is coded using various parameters.

In addition, an image coding method of coding a multiview video, may include: coding an image of a base view; writing view components including the coded image of the base view into NAL units without using prefix NAL units; determining NAL unit header MVC extension parameters of a non-base view; computing NAL unit header MVC extension parameters for the base view; coding an image of the non-base view, using the computed NAL unit header MVC extension parameters of the base view and the determined NAL unit header MVC extension parameters of the non-base view; and writing view components including the coded image of the non-base view into NAL units, wherein each of the base view and the non-base view may be assigned with the NAL unit header MVC extension parameters including a non-IDR flag (non_idr_flag), a priority ID (priority_id), a view ID (view_id), a temporal ID (temporal_id), an anchor picture flag (anchor_pic_flag), and an inter-view prediction flag (inter_view_flag), and the computing NAL unit header MVC extension parameters for the base view may include: obtaining a value of the non-IDR flag (non_idr_flag) from among the NAL unit header MVC extension parameters of the non-base view; assigning the value of the non-IDR flag (non_idr_flag) obtained from among the NAL unit header MVC extension parameters of the non-base view to the non-IDR flag (non_idr_flag) included in the NAL unit header MVC extension parameters of the base view; assigning a first predefined value to the priority ID (priority_id) included in the NAL unit header MVC extension parameters of the base view; assigning a second predefined value to the view ID (view_id) included in the NAL unit header MVC extension parameters of the base view; obtaining a value of the temporal ID (temporal_id) from among the NAL unit header MVC extension parameters of the non-base view; assigning the value of the temporal ID (temporal_id) obtained from among the NAL unit header MVC extension parameters of the non-base view to the temporal ID (temporal_id) included in the NAL unit header MVC extension parameters of the base view; obtaining a value of the anchor picture flag (anchor_pic_flag) from among the NAL unit header MVC extension parameters of the non-base view; assigning the value of the anchor picture flag (anchor_pic_flag) obtained from among the NAL unit header MVC extension parameters of the non-base view to the anchor picture flag (anchor_pic_flag) included in the NAL unit header MVC extension parameters of the base view; and assigning a third predefined value to the inter-view prediction flag (inter_view_flag) included in the NAL unit header MVC extension parameters of the base view.

In this way, NAL unit header MVC extension parameters for a base view are specifically computed.

In addition, an image coding method according to the present invention is for coding a multiview video, and may include: determining NAL unit header MVC extension parameters of a base view; determining NAL unit header MVC extension parameters of a non-base view; switching between writing and not writing the NAL unit header MVC extension parameters of the base view into prefix NAL units; writing the determined NAL unit header MVC extension parameters of the base view into the prefix NAL units when the switching is performed to write the NAL unit header MVC extension parameters of the base view into the prefix NAL units; coding an image of the base view; writing view components including the coded image of the base view into NAL units; coding an image of the non-base view, using the determined NAL unit header MVC extension parameters of the base view and the determined NAL unit header MVC extension parameters of the non-base view; and writing view components including the coded image of the non-base view into NAL units.

In this way, presence or absence of prefix NAL units can be switched in multiview video coding. In addition, load for computing NAL unit header MVC extension parameters for a base view is reduced.

In addition, each of the base view and the non-base view may be assigned with the NAL unit header MVC extension parameters including a non-IDR flag (non_idr_flag), a priority ID (priority_id), a view ID (view_id), a temporal ID (temporal_id), an anchor picture flag (anchor_pic_flag), and an inter-view prediction flag (inter_view_flag), and the determining NAL unit header MVC extension parameters of a base view may include: assigning a predefined first value to the priority ID (priority_id) included in the NAL unit header MVC extension parameters of the base view; assigning a predefined second value to the view ID (view_id) included in the NAL unit header MVC extension parameters of the base view; and assigning a predefined third value to the inter-view prediction flag (inter_view_flag) included in the NAL unit header MVC extension parameters of the base view.

In this way, a non-base view is coded using various parameters.

In addition, an image coding method of coding a multiview video, may include: coding an image of a base view; writing view components including the coded image of the base view into NAL units without using prefix NAL units; determining NAL unit header MVC extension parameters of a non-base view; computing NAL unit header MVC extension parameters for the base view; coding an image of the non-base view, using the computed NAL unit header MVC extension parameters of the base view and the determined NAL unit header MVC extension parameters of the non-base view; and writing view components including the coded image of the non-base view into NAL units, wherein each of the base view and the non-base view may be assigned with the NAL unit header MVC extension parameters including a non-IDR flag (non_idr_flag), a priority ID (priority_id), a view ID (view_id), a temporal ID (temporal_id), an anchor picture flag (anchor_pic_flag), and an inter-view prediction flag (inter_view_flag), and the computing NAL unit header MVC extension parameters for the base view may include: obtaining a value of a NAL unit type (nal_unit_type) from among NAL unit headers of the base view; assigning 0 to the non-IDR flag (non_idr_flag) included in the NAL unit header MVC extension parameters of the base view if the value of the NAL unit type (nal_unit_type) is 5; assigning 1 to the non-IDR flag (non_idr_flag) included in the NAL unit header MVC extension parameters of the base view if the value of the NAL unit type (nal_unit_type) is 1; assigning a first predefined value to the priority ID (priority_id) included in the NAL unit header MVC extension parameters of the base view; assigning a second predefined value to the view ID (view_id) included in the NAL unit header MVC extension parameters of the base view; obtaining a value of the temporal ID (temporal_id) from among the NAL unit header MVC extension parameters of the non-base view; assigning the value of the temporal ID (temporal_id) obtained from among the NAL unit header MVC extension parameters of the non-base view to the temporal ID (temporal_id) included in the NAL unit header MVC extension parameters of the base view; obtaining a value of the anchor picture flag (anchor_pic_flag) from among the NAL unit header MVC extension parameters of the non-base view; assigning the value of the anchor picture flag (anchor_pic_flag) obtained from among the NAL unit header MVC extension parameters of the non-base view to the anchor picture flag (anchor_pic_flag) included in the NAL unit header MVC extension parameters of the base view; and assigning a third predefined value to the inter-view prediction flag (inter_view_flag) included in the NAL unit header MVC extension parameters of the base view.

In this way, NAL unit header MVC extension parameters for a base view are specifically computed. In addition, the use of the NAL unit header of a base view makes it possible to compute more precise values.

In addition, the first predefined value assigned to the priority ID (priority_id) may be 0.

In this way, a base view is handled preferentially.

In addition, the second predefined value assigned to the view ID (view_id) may be 0.

In this way, the view ID (view_id) of a base view is a distinguishable fixed value.

In addition, the third predefined value assigned to the inter-view prediction flag (inter_view_flag) may be 1.

In this way, a decoded image of a base view can be used for inter-view prediction.

In addition, an image decoding apparatus according to the present invention is intended to decode a multiview video, and may include: a base view NAL unit parsing unit configured to parse NAL units including an image included in view components of a base view; a base view decoding unit configured to decode the image included in the view components of the base view; a non-base view MVC extension parameter parsing unit configured to parse NAL unit header MVC extension parameters of a non-base view; a prefix NAL unit searching unit configured to search the view components of the base view for prefix NAL units; a base view MVC extension parameter computation unit configured to compute NAL unit header MVC extension parameters for the base view when no prefix NAL units are present in the view components of the base view; a base view MVC extension parameter parsing unit configured to parse, when prefix NAL units are present in the view components of the base view, the NAL unit header MVC extension parameters of the base view, with reference to the prefix NAL units; a non-base view NAL unit parsing unit configured to parse NAL units including an image included in view components of the non-base view; and a non-base view decoding unit configured to decode the image included in the view components of the non-base view, using (i) the computed or parsed NAL unit header MVC extension parameters of the base view and (ii) the parsed NAL unit header MVC extension parameters of the non-base view.

In this way, a multiview video is decoded even when no prefix NAL units are used.

In addition, an image coding apparatus according to the present invention is intended to code a multiview video, and may include: a base view coding unit configured to code an image of a base view; a base view writing unit configured to write view components including the coded image of the base view into NAL units without using prefix NAL units; a non-base view MVC extension parameter determination unit configured to determine NAL unit header MVC extension parameters of a non-base view; a base view NAL unit header MVC extension parameter computation unit configured to compute NAL unit header MVC extension parameters for the base view; a non-base view coding unit configured to code an image of the non-base view, using the computed NAL unit header MVC extension parameters of the base view and the determined NAL unit header MVC extension parameters of the non-base view; and a non-base view writing unit configured to write view components including the coded image of the non-base view into NAL units.

In this way, a multiview video is coded without using prefix NAL units.

In addition, an image coding apparatus according to the present invention is intended to code a multiview video, and may include: a base view MVC extension parameter determination unit configured to determine NAL unit header MVC extension parameters of a base view; a non-base view MVC extension parameter determination unit configured to determine NAL unit header MVC extension parameters of a non-base view; a prefix NAL unit writing switching unit configured to switch between writing and not writing the NAL unit header MVC extension parameters of the base view into prefix NAL units; a prefix NAL unit writing unit configured to write the determined NAL unit header MVC extension parameters of the base view into the prefix NAL units when the switching is performed to write the NAL unit header MVC extension parameters of the base view into the prefix NAL units; a base view coding unit configured to code an image of the base view; a base view writing unit configured to write view components including the coded image of the base view into NAL units; a non-base view coding unit configured to code an image of the non-base view, using the determined NAL unit header MVC extension parameters of the base view and the determined NAL unit header MVC extension parameters of the non-base view; and a non-base view writing unit configured to write view components including the coded image of the non-base view into NAL units.

In this way, presence or absence of prefix NAL units can be switched in multiview video coding. In addition, load for computing NAL unit header MVC extension parameters for a base view is reduced.

According to the present invention, a multiview video is coded and/or decoded even when no prefix NAL units are used.

Accordingly, even a legacy AVC decoder incapable of decoding a base view due to prefix NAL units can decode the base view included in a multiview video. In addition, it is easy to add another view to a stream generated by coding a single view because no prefix NAL units are used. Furthermore, it is easy to use a conventional bitstream generated by a legacy AVC encoder as a base view of a multiview video.

FURTHER INFORMATION ABOUT TECHNICAL BACKGROUND TO THIS APPLICATION

The disclosure of Japanese Patent Application No. 61-173380 filed on Apr. 28, 2009 including specification, drawings and claims is incorporated herein by reference in its entirety.

The disclosure of PCT application No. PCT/JP10/003041 filed on, Apr. 28, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

New methods are introduced which include signaling parameters contained in the MVC extension part of the NAL unit header of each prefix NAL unit to the MVC decoder without coding the prefix NAL unit in the compressed MVC stream. The present invention is novel in the point of allowing determination of the values associated with a base view of the coded MVC stream required to decode the corresponding non-base view without using prefix NAL units that may create a problem in the decoding process by a legacy AVC decoder. The present invention allows such legacy AVC decoders in the market to decode base views of MVC streams and also allows MVC decoders according to the present invention to decode all the coded views of the MVC streams.

Embodiment 1

First, Embodiment 1 is described.

Figure 1:
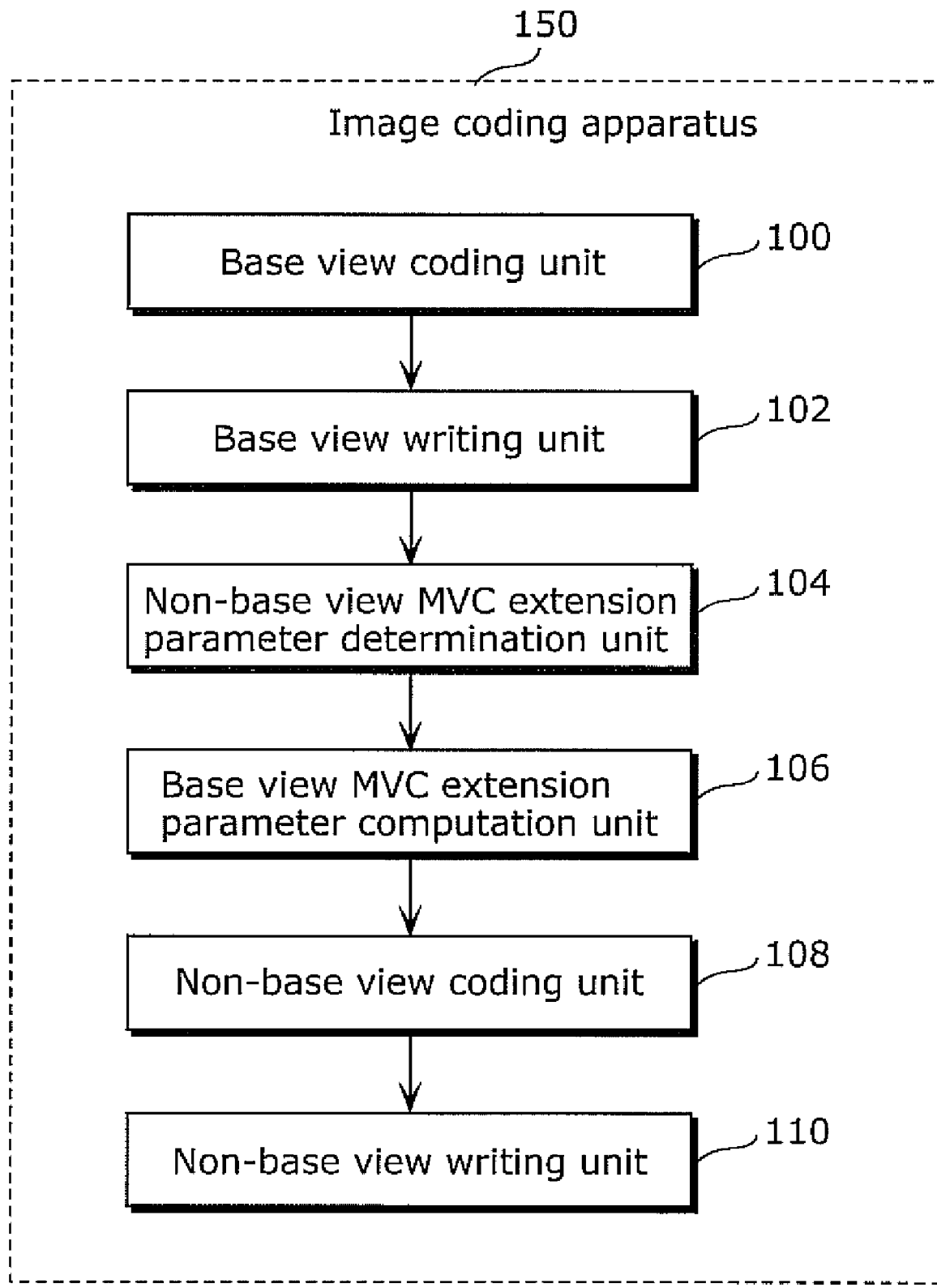
FIG. 1 is a structural diagram of constituent elements of an image coding apparatus in Embodiment 1 of the present invention.

FIG. 1 is a structural diagram of constituent elements of an image coding apparatus in Embodiment 1 of the present invention. The image coding apparatus 150 shown in FIG. 1 includes a base view coding unit 100, a base view writing unit 102, a non-base view MVC extension parameter determination unit 104, a base view MVC extension parameter computation unit 106, a non-base view coding unit 108, and a non-base view writing unit 110. Each of the processing units executes a corresponding one of the following processes.

Figure 2:
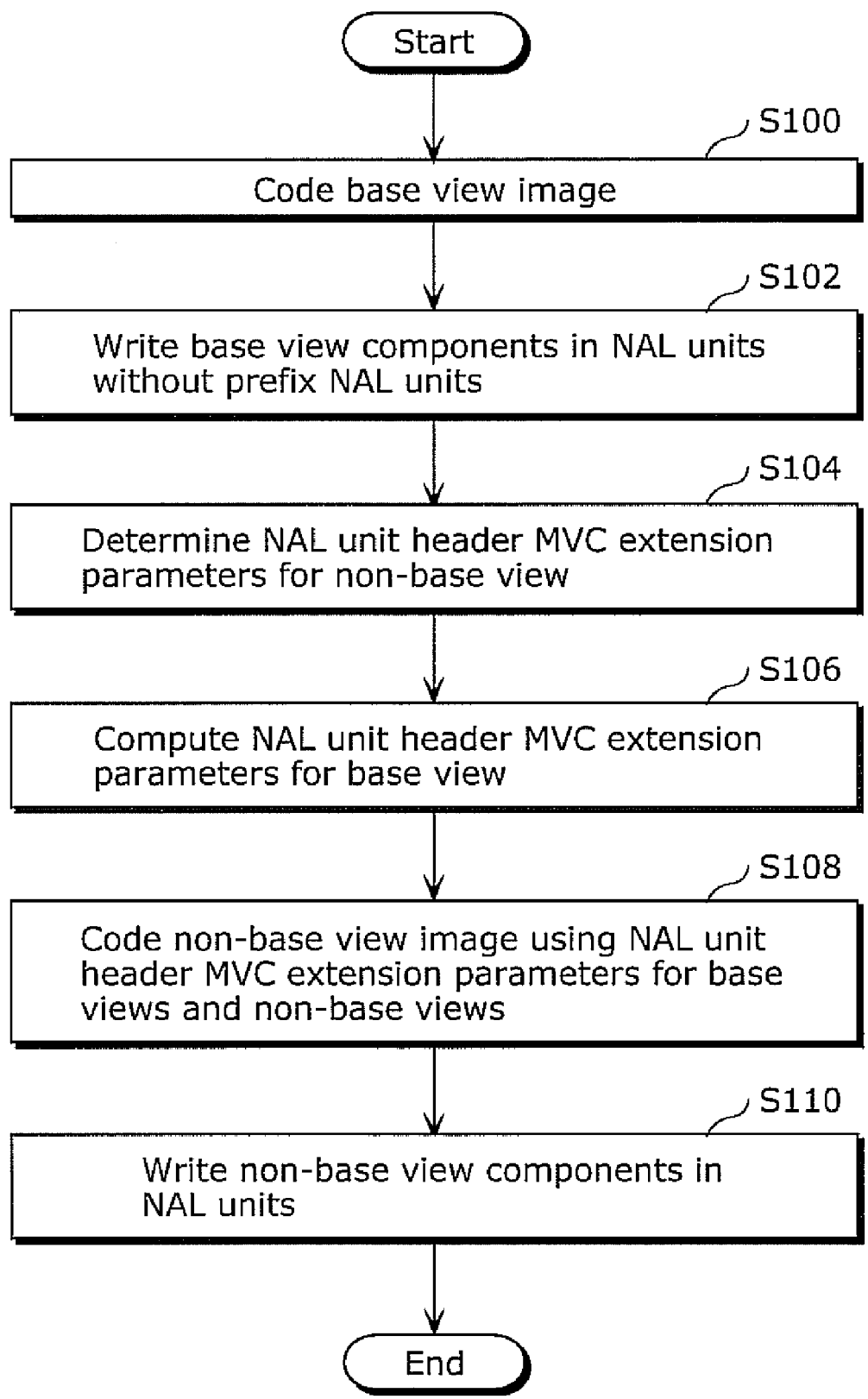
FIG. 2 is a flowchart showing coding processing in Embodiment 1 of the present invention.

FIG. 2 is a flowchart showing coding processing in Embodiment 1 of the present invention.

First, the base view coding unit 100 codes a base view image (S100). The base view image is coded using the multiview video coding standard. The base view image coded using the multiview video coding standard can be decoded according to the Advanced Video Coding standard.

Figure 23:
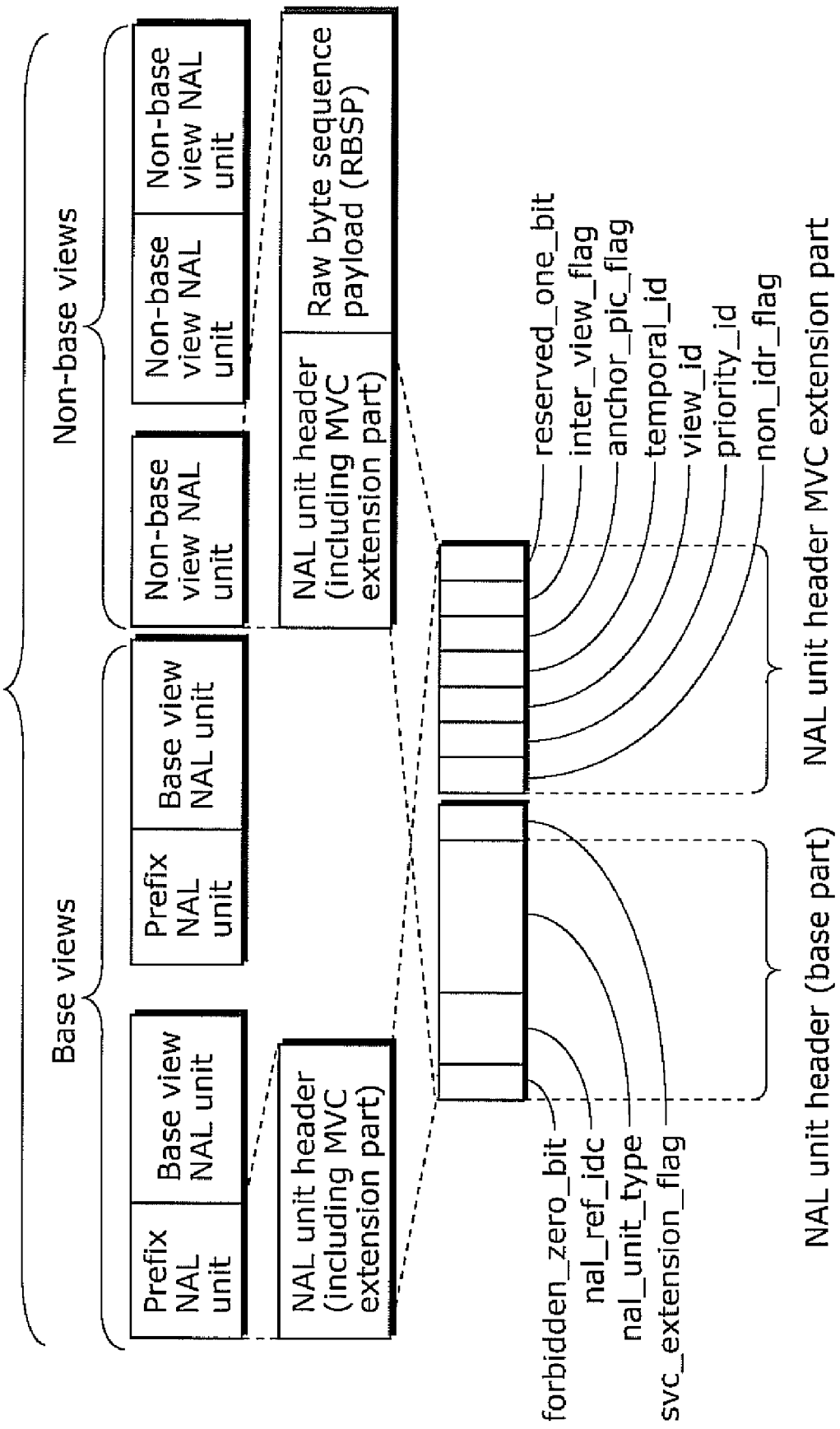
FIG. 23 is a diagram showing the location of NAL unit header MVC extension syntaxes.

Next, the base view writing unit 102 writes compressed base view components in NAL units (S102). The NAL units for the base view are filled without use of prefix NAL units as shown in FIG. 23.

Next, the non-base view MVC extension parameter determination unit 104 determines NAL unit header MVC extension parameters of a non-base view (S104). Examples of these parameters include a non-IDR flag (non_idr_flag), a priority ID (priority_id), a view ID (view_id), a temporal ID (temporal_id), an anchor picture flag (anchor_pic_flag), and an inter view prediction flag (inter_view_flag).

Next, the base view MVC extension parameter computation unit 106 computes NAL unit header MVC extension parameters of a base view (S106). Examples of these parameters include a non-IDR flag (non_idr_flag), a priority ID (priority_id), a view ID (view_id), a temporal ID (temporal_id), an anchor picture flag (anchor_pic_flag), and an inter-view prediction flag (inter_view_flag).

The NAL unit header MVC extension parameters of the base view are stored in the MVC extension part of the NAL unit header of a prefix NAL unit in an assumed case where the prefix NAL unit is used.

Next, the non-base view coding unit 108 codes a non-base view image using the NAL unit header MVC extension parameters of the base view and non-base view (S108).

Lastly, the non-base view writing unit 110 writes non-base view components in NAL units (S110).

Figure 3:
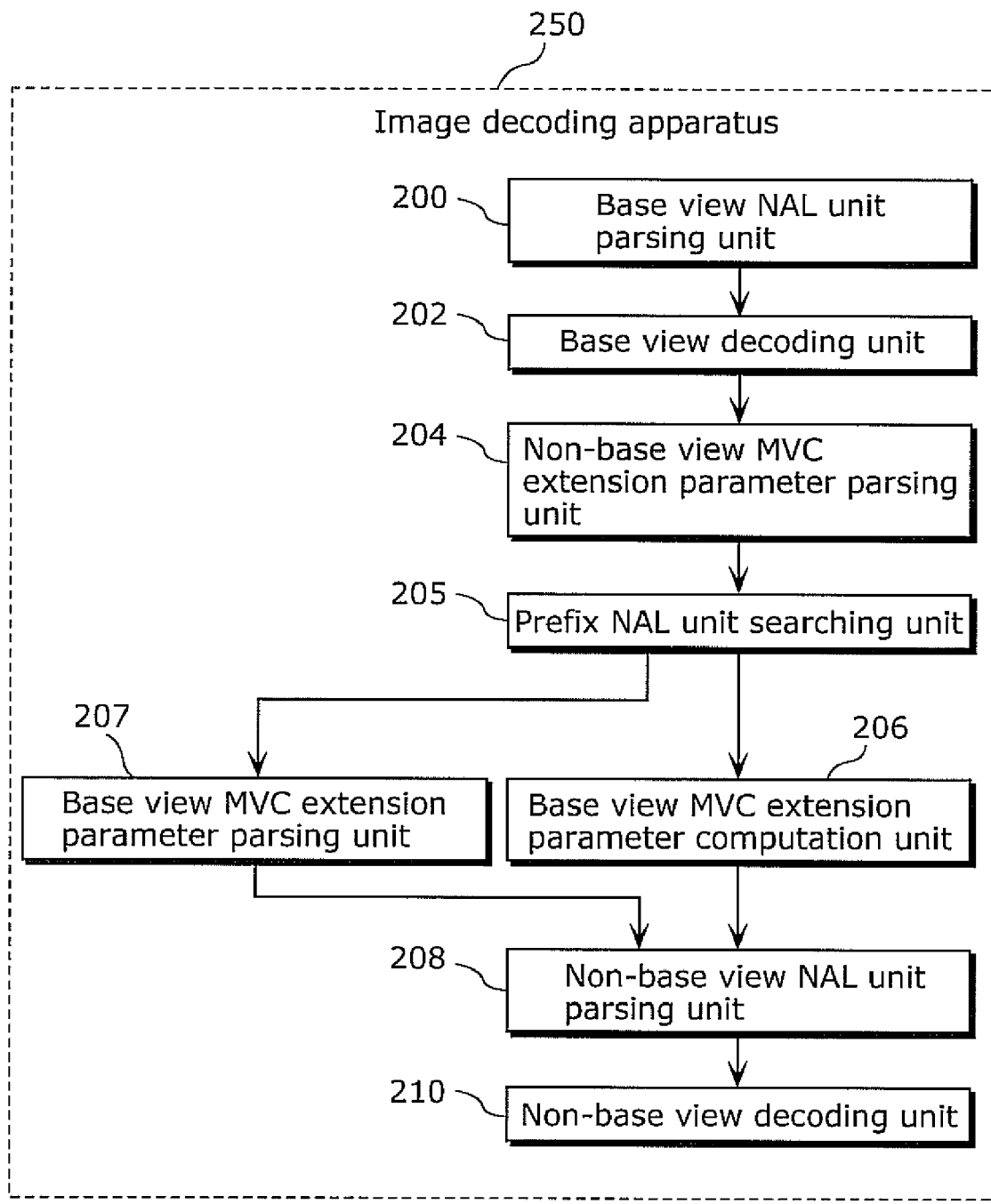
FIG. 3 is a structural diagram of constituent elements of an image decoding apparatus in Embodiment 1 of the present invention.

FIG. 3 is a structural diagram of constituent elements of an image decoding apparatus in Embodiment 1 of the present invention.

The image decoding apparatus 250 shown in FIG. 3 includes a base view NAL unit parsing unit 200, a base view decoding unit 202, a non-base view MVC extension parameter parsing unit 204, a prefix NAL unit searching unit 205, a base view MVC extension parameter computation unit 206, a base view MVC extension parameter parsing unit 207, a non-base view NAL unit parsing unit 208, and a non-base view decoding unit 210. Each of the processing units executes a corresponding one of the following processes.

Figure 4:
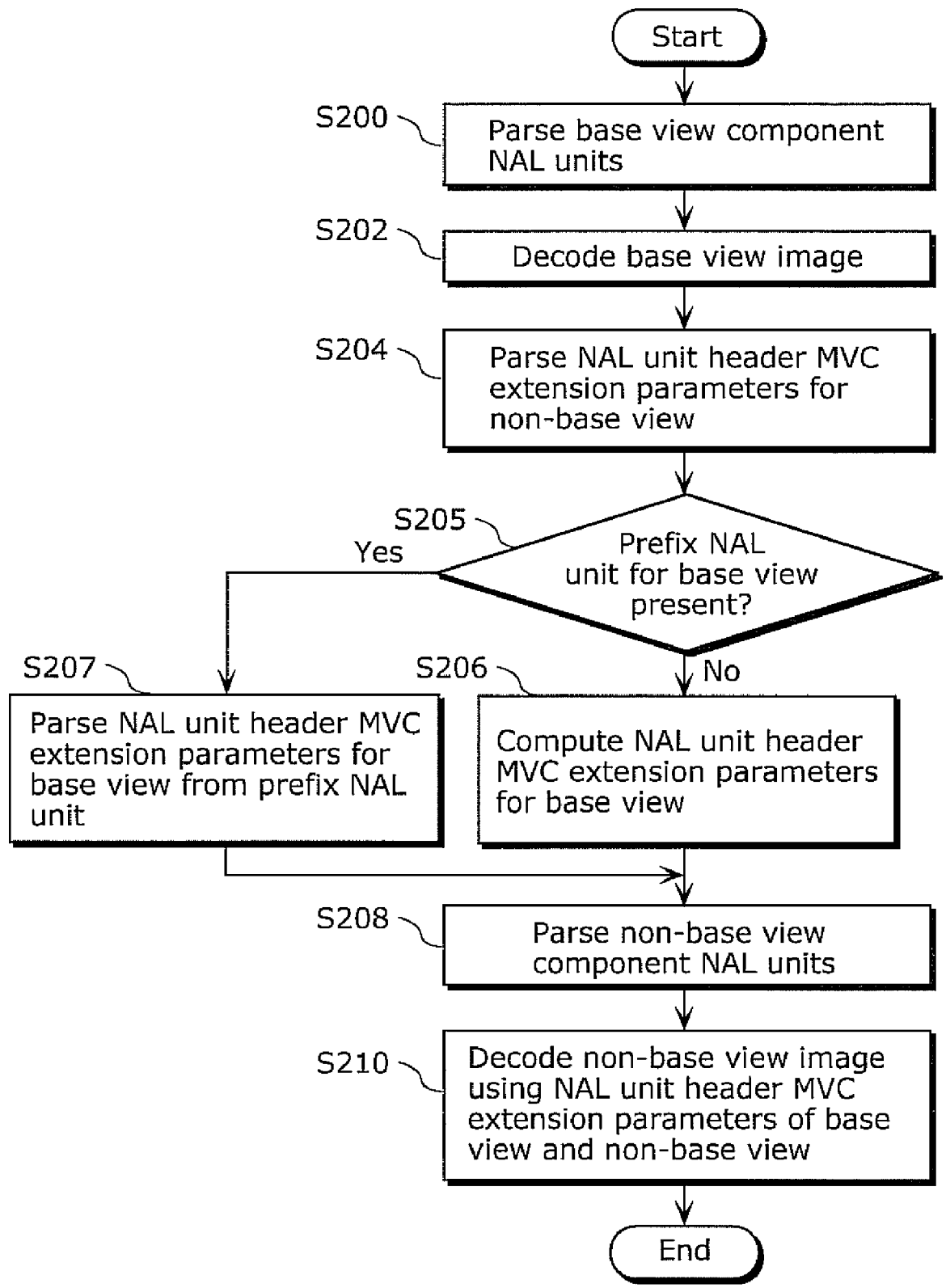
FIG. 4 is a flowchart showing decoding processing in Embodiment 1 of the present invention.

FIG. 4 is a flowchart showing decoding processing in Embodiment 1 of the present invention.

First, the base view NAL unit parsing unit 200 parses the NAL units of base view components (S200).

Next, the base view decoding unit 202 decodes the base view image using the coding processing described in the multiview video coding standard (S202).

Next, the non-base view MVC extension parameter parsing unit 204 parses the NAL unit header MVC extension parameters of the non-base view (S204). In other words, the non-base view MVC extension parameter parsing unit 204 obtains the non-base view MVC extension parameters by parsing the NAL unit header of the non-base view.

Examples of these parameters include a non-IDR flag (non_idr_flag), a priority ID (priority_id), a view ID (view_id), a temporal ID (temporal_id), an anchor picture flag (anchor_pic_flag), and an inter-view prediction flag (inter_view_flag).

Next, the prefix NAL unit searching unit 205 searches for prefix NAL units of the base view (S205).

Here, in the case where prefix NAL units of the base view are present in the base view (Yes in S205), the base view MVC extension parameter parsing unit 207 parses the NAL unit header MVC extension parameters of the base view, based on the prefix NAL units (S207). In other words, the base view MVC extension parameter parsing unit 207 obtains the NAL unit header MVC extension parameters of the base view, by parsing the NAL unit headers of the prefix NAL units.

In the opposite case where no prefix NAL units of the base view are present in the base view (No in S205), the base view MVC extension parameter computation unit 206 computes NAL unit header MVC extension parameters of the base view (S206).

Examples of these parameters include a non-IDR flag (non_idr_flag), a priority ID (priority_id), a view ID (view_id), a temporal ID (temporal_id), an anchor picture flag (anchor_pic_flag), and an inter-view prediction flag (inter_view_flag).

Next, the non-base view NAL unit parsing unit 208 parses the NAL units of non-base view components (S208).

Lastly, the non-base view decoding unit 210 decodes the non-base view image using the NAL unit header MVC extension parameters of the base view and non-base view, according to the decoding specified by the multiview video coding standard (S210).

Figure 5:
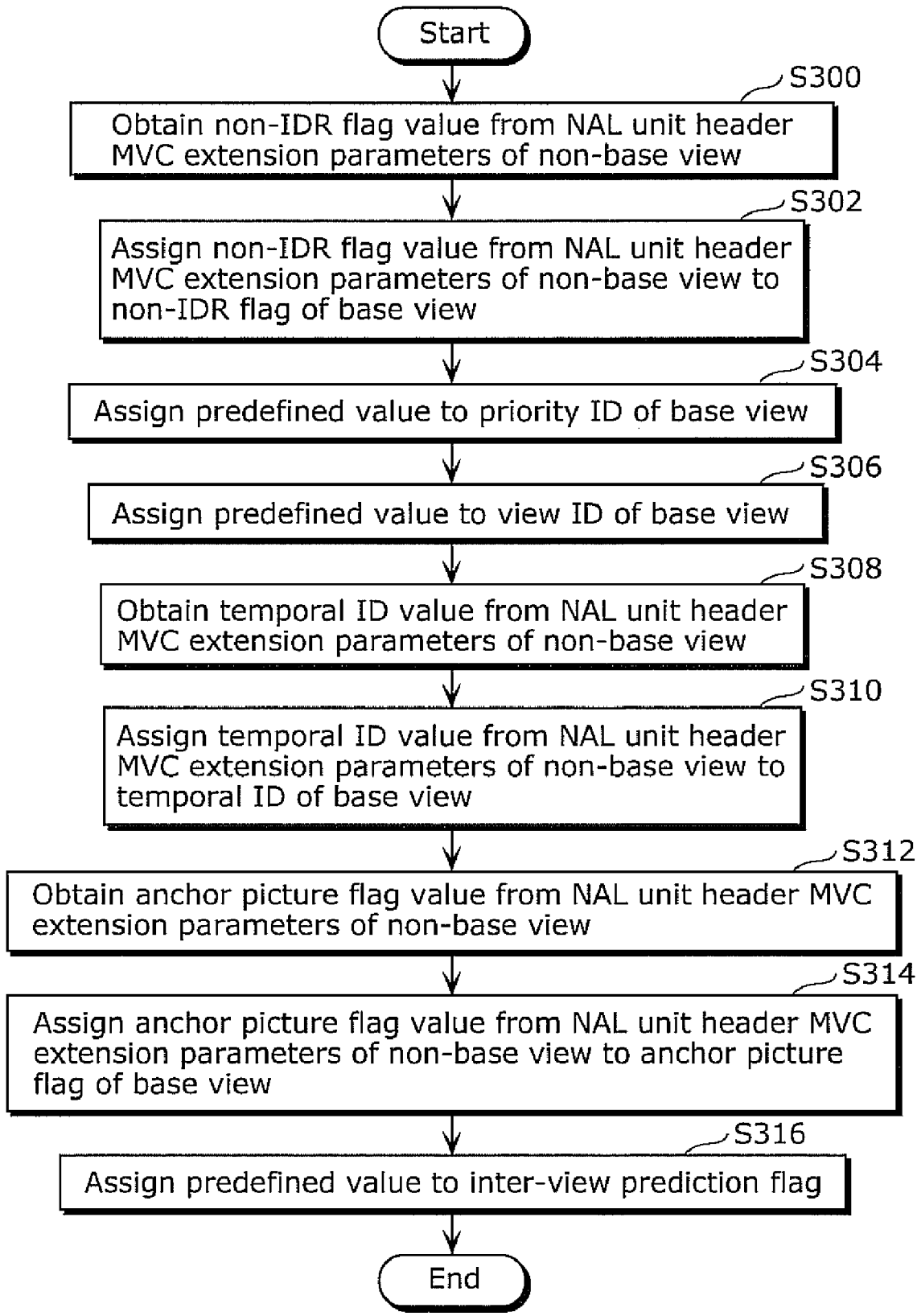
FIG. 5 is a flowchart showing processing to compute base view NAL unit header MVC extension parameters in Embodiment 1 of the present invention.

FIG. 5 is a flowchart showing processing to compute NAL unit header MVC extension parameters for a base view in Embodiment 1 of the present invention. Examples of these parameters include a non-IDR flag (non_idr_flag), a priority ID (priority_id), a view ID (view_id), a temporal ID (temporal_id), an anchor picture flag (anchor_pic_flag), and an inter-view prediction flag (inter_view_flag). The following describes processing executed by the base view MVC extension parameter computation unit 106 of the image coding apparatus 150. The base view MVC extension parameter computation unit 206 of the image decoding apparatus 250 executes the same processing.

First, the base view MVC extension parameter computation unit 106 reads the value of the non-IDR flag (non_idr_flag) from among the NAL unit header MVC extension parameters of the non-base view (S300).

Next, the base view MVC extension parameter computation unit 106 assigns the value of the non-IDR flag (non_idr_flag) of the non-base view to the non-IDR flag (non_idr_flag) of the base view (S302).

Next, base view MVC extension parameter computation unit 106 assigns a predefined value to the priority ID (priority_id) of the base view (S304). The value predefined as the value of the priority ID (priority_id) is 0.

Next, the base view MVC extension parameter computation unit 106 assigns a predefined value to the view ID (view_id) (S306). The value predefined as the value of the view ID (view_id) is also 0.

Next, the base view MVC extension parameter computation unit 106 obtains the value of the temporal ID (temporal_id) of the non-base view from among the NAL unit header MVC extension parameters of the non-base view (S308).

Next, the base view MVC extension parameter computation unit 106 assigns the obtained value of the temporal ID (temporal_id) of the non-base view to the temporal ID (temporal_id) of the base view (S310).

Next, the base view MVC extension parameter computation unit 106 obtains the value of the anchor picture flag (anchor_pic_flag) from among the NAL unit header MVC extension parameters of the non-base view (S310).

Next, the base view MVC extension parameter computation unit 106 assigns the obtained value of the anchor picture flag (anchor_pic_flag) of the non-base view to the anchor picture flag (anchor_pic_flag) of the base view (S314).

Figure 6:
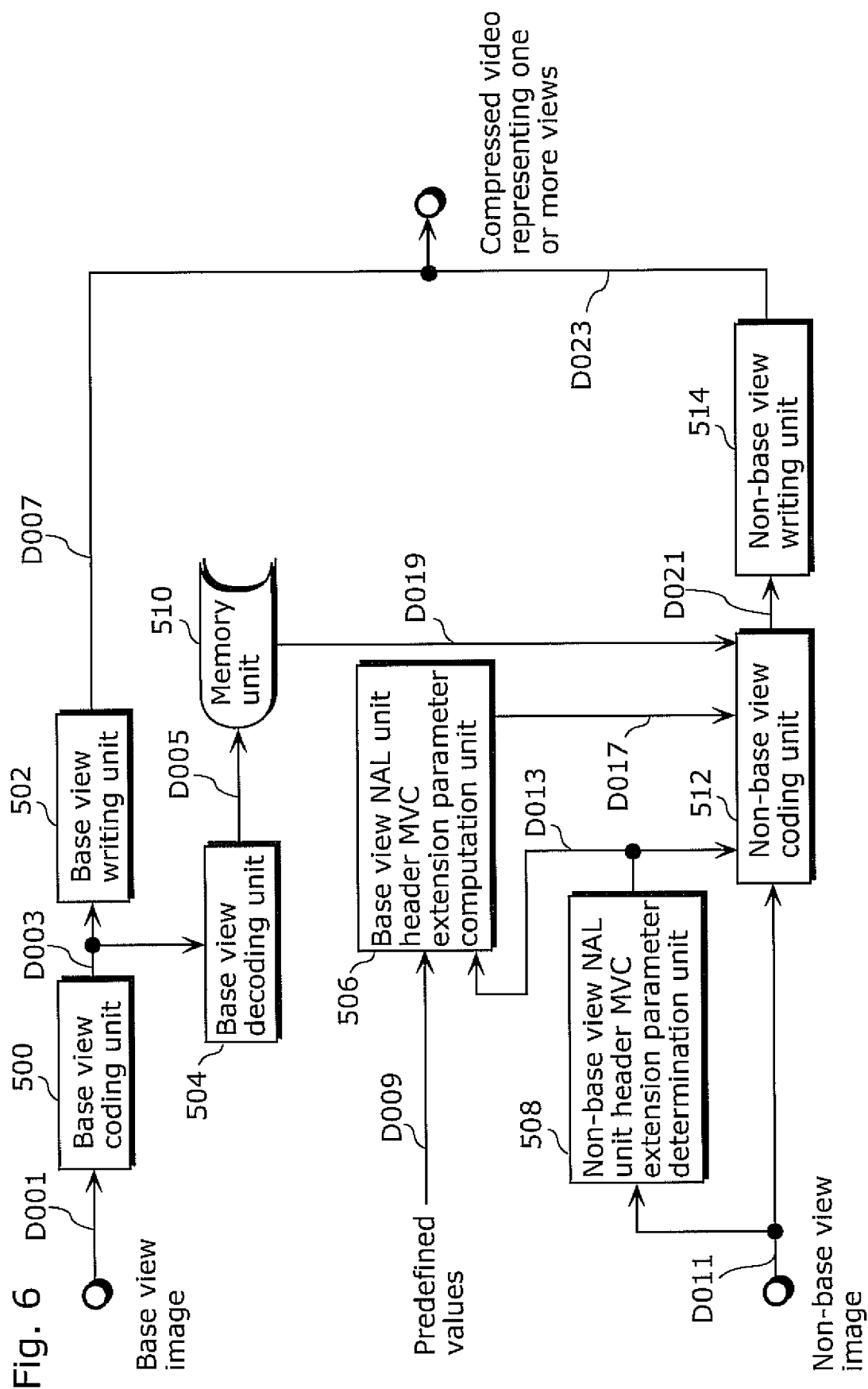
FIG. 6 is a diagram showing an example of the image coding apparatus in Embodiment 1 of the present invention.

Lastly, the base view MVC extension parameter computation unit 106 sets a predefined value to the inter-view prediction flag (inter_view_flag) of the base view (S316). The value predefined as the inter-view prediction flag (inter_view_flag) of the base view is 1. FIG. 6 is a diagram showing an example of the image coding apparatus in Embodiment 1 of the present invention. This apparatus includes a base view coding unit 500, a base view writing unit 502, a base view decoding unit 504, a base view NAL unit header MVC extension parameter computation unit 506, a non-base view NAL unit header MVC extension parameter determination unit 508, a memory unit 510, a non-base view coding unit 512, and a non-base view writing unit 514.

Firstly, a base view image D001 is input to the base view coding unit 500, and a compressed image D003 is output to both the base view writing unit 502 and the base view decoding unit 504. The base view decoding unit 504 reads the compressed base view image D003, and outputs the decoded base view image D005 to the memory unit 510.

As shown in FIG. 6, a non-base view image D011 is input to both the non-base view NAL unit header MVC extension parameter determination unit 508 and the non-base view coding unit 512. The non-base view NAL unit header MVC extension parameter determination unit 508 then outputs the NAL unit header MVC extension parameters of the non-base view D013 to both the base view NAL unit header MVC extension parameter computation unit 506 and the non-base view coding unit 512. The base view NAL unit header MVC extension parameter computation unit 506 obtains the predefined values D009 and the non-base view NAL unit header MVC extension parameters D013, assigns the values to the base view NAL unit header MVC extension parameters, and outputs the base view NAL unit header MVC extension parameters D017 to the non-base view coding unit 512. The non-base view coding unit 512 then obtains a non-base view image D011, the non-base view NAL unit header MVC extension parameters D013, the base view NAL unit header MVC extension parameters D017, and a decoded base view image D019, and outputs a compressed non-base view image D021.

Lastly, the base view writing unit 502 obtains a compressed base view image D003 and outputs it as a compressed image D007 in a NAL unit, and the non-base view writing unit 514 obtains a compressed non-base view image D021 and outputs it as a compressed image D023 in the NAL unit.

An image coding apparatus shown in FIG. 6 is a specific example of the image coding apparatus 150 shown in FIG. 1. The processing performed by each of the structural elements shown in FIG. 1 is executed by a corresponding one of the structural elements shown in FIG. 6.

The processing of the base view coding unit 100 is executed by the base view coding unit 500. The processing of the base view writing unit 102 is executed by the base view writing unit 502. The processing performed by the non-base view MVC extension parameter determination unit 104 is executed by the non-base view NAL unit header MVC extension parameter determination unit 508. The processing performed by the base view MVC extension parameter computation unit 106 is executed by the base view NAL unit header MVC extension parameter computation unit 506. The processing of the non-base view coding unit 108 is executed by the non-base view coding unit 512. The processing of the non-base view writing unit 110 is executed by the non-base view writing unit 514.

Figure 7:
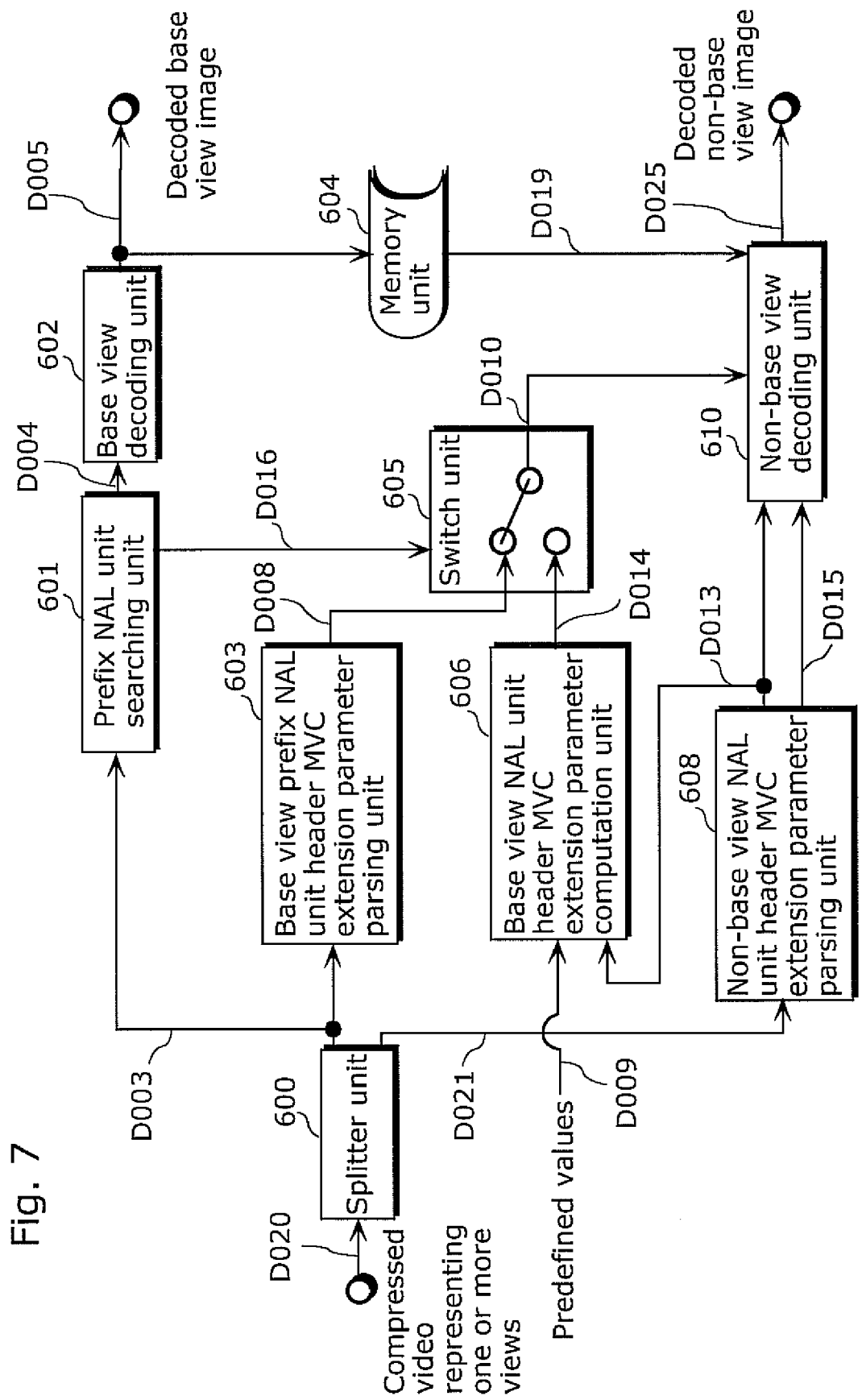
FIG. 7 is a diagram showing an example of the image decoding apparatus in Embodiment 1 of the present invention.

FIG. 7 is a diagram showing an example of the image decoding apparatus in Embodiment 1 of the present invention. The apparatus includes a splitter unit 600, a prefix NAL unit searching unit 601, a base view decoding unit 602, a base view prefix NAL unit header MVC extension parameter parsing unit 603, a memory unit 604, a switch unit 605, a non-base view NAL unit header MVC extension parameter parsing unit 608, a base view NAL unit header MVC extension parameter computation unit 606, and a non-base view decoding unit 610.

As shown in FIG. 7, the splitter unit 600 obtains a compressed video D020 of one or more views, and divides it into a compressed base view image D003 provided to the prefix NAL unit searching unit 601 and a compressed non-base view image D021 provided to the non-base view NAL unit header MVC extension parameter parsing unit 608. The compressed base view image D003 is also output from the splitter unit 600 to the base view prefix NAL unit header MVC extension parameter parsing unit 603. The prefix NAL unit searching unit 601 searches the base view for prefix NAL units, and outputs a signal D016 indicating presence or absence of the prefix NAL units to the switch unit 605. The prefix NAL unit searching unit 601 also outputs the compressed base view image D004 to the base view decoding unit 602.

The base view decoding unit 602 obtains the compressed base view image D004, and outputs a decoded base view image D005. The decoded base view image D005 is then stored in the memory unit 604.

The base view prefix NAL unit header MVC extension parameter parsing unit 603 reads the compressed base view image D003, and outputs the base view NAL unit header MVC extension parameters D008 if prefix NAL units are present in the compressed base view.

The non-base view NAL unit header MVC extension parameter parsing unit 608, obtains the compressed non-base view image D021, and outputs the non-base view NAL unit header MVC extension parameters D013 to both the base view NAL unit header MVC extension parameter computation unit 606 and the non-base view decoding unit 610. The non-base view NAL unit header MVC extension parameter parsing unit 608 also outputs the compressed non-base view image D015 to the non-base view decoding unit 610. The base view NAL unit header MVC extension parameter computation unit 606 obtains the predefined values D009 and the non-base view NAL unit header MVC extension parameters D013, assigns the values to the base view NAL unit header MVC extension parameters, and outputs the base view NAL unit header MVC extension parameters D014 to the switch unit 605.

Whether prefix NAL units are present in or absent from the compressed base view is determined based on a signal D016 signaled by the prefix NAL unit searching unit 601. If no prefix NAL units are present in the base view, the switch unit 605 passes the computed base view NAL unit header MVC extension parameters D014 to the non-base view decoding unit 610. If prefix NAL units are present, the switch unit 605 passes the parsed base view NAL unit header MVC extension parameters D010 to the non-base view decoding unit 610.

Finally, the non-base view decoding unit 610 obtains the decoded base view image D019, base view NAL unit header MVC extension parameters D010, parsed non-base view NAL unit header MVC extension parameters D013, and a compressed non-base view image D015, and outputs the decoded non-base view image D025. An image decoding apparatus shown in FIG. 7 is a specific example of the image decoding apparatus 250 shown in FIG. 3. The processing performed by each of the structural elements shown in FIG. 3 is executed by a corresponding one of the structural elements shown in FIG. 7.

The processing performed by the base view NAL unit parsing unit 200 and the base view decoding unit 202 is executed by the base view decoding unit 602. The processing performed by the non-base view MVC extension parameter parsing unit 204 is executed by the non-base view NAL unit header MVC extension parameter parsing unit 608. The processing performed by the prefix NAL unit searching unit 205 is executed by the prefix NAL unit searching unit 601. The processing performed by the base view MVC extension parameter parsing unit 207 is executed by the base view prefix NAL unit header MVC extension parameter parsing unit 603. The processing performed by the base view MVC extension parameter computation unit 206 is executed by the base view NAL unit header MVC extension parameter computation unit 606. The processing performed by the non-base view NAL unit parsing unit 208 and the non-base view decoding unit 210 is executed by the non-base view decoding unit 610. As described above, the image coding apparatus 150 in Embodiment 1 codes a multiview video without using prefix NAL units. In this way, even a legacy AVC decoder that is incapable of decoding a base view due to prefix NAL units included in a coded multiview video can decode a base view. In addition, the image decoding apparatus 250 shown in Embodiment 1 can decode all the views included in the coded multiview video irrespective of whether or not the coded multiview video includes prefix NAL units.

In addition, omitting prefix NAL units increases coding efficiency.

It is noted that the image decoding apparatus 250 either parses the base view MVC extension parameters or computes base view MVC extension parameters, depending on the presence or absence of prefix NAL units. However, the image decoding apparatus 250 may decode a non-base view image by computing the base view MVC extension parameters from the non-base view MVC extension parameters irrespective of the presence or absence of prefix NAL units.

In this case, there is no need to include the prefix NAL unit searching unit 205, the base view MVC extension parameter parsing unit 207, and the processing executed thereby. The image decoding apparatus 250 is capable of decoding a coded multiview video even when (i) the image decoding apparatus 250 does not include such structural elements and (ii) the coded multiview video does not include prefix NAL units.

The processing flows shown in FIGS. 2, 4, and 5 are exemplary. Thus, the processing flows executed by the image coding apparatus 150 and the image decoding apparatus 250 are not limited to the processing flows shown in FIGS. 2, 4, and 5. For example, the image coding apparatus 150 and the image decoding apparatus 250 may execute the processing shown in the respective diagrams in orders different from the orders of the processing shown in the corresponding diagrams, or otherwise may execute the processing shown in the respective diagrams in parallel.

In addition, the predefined values to be assigned to the priority ID (priority_id), view ID (view_id), and inter-view prediction flag (view_inter_flag) may be values different from the values shown in Embodiment 1.

In addition, there may be plural non-base views.

Embodiment 2

Next, Embodiment 2 is described.

An image coding apparatus 150 in Embodiment 2 includes structural elements similar to those in the image coding apparatus 150 in Embodiment 1 shown in FIG. 1. The image coding apparatus 150 in Embodiment 2 executes coding processing similar to the coding processing in Embodiment 1 shown in FIG. 2. An image decoding apparatus 250 in Embodiment 2 includes structural elements similar to those in the image decoding apparatus 250 in Embodiment 1 shown in FIG. 3. The image decoding apparatus 250 in Embodiment 2 executes decoding processing similar to the decoding processing in Embodiment 1 shown in FIG. 4.

Figure 8:
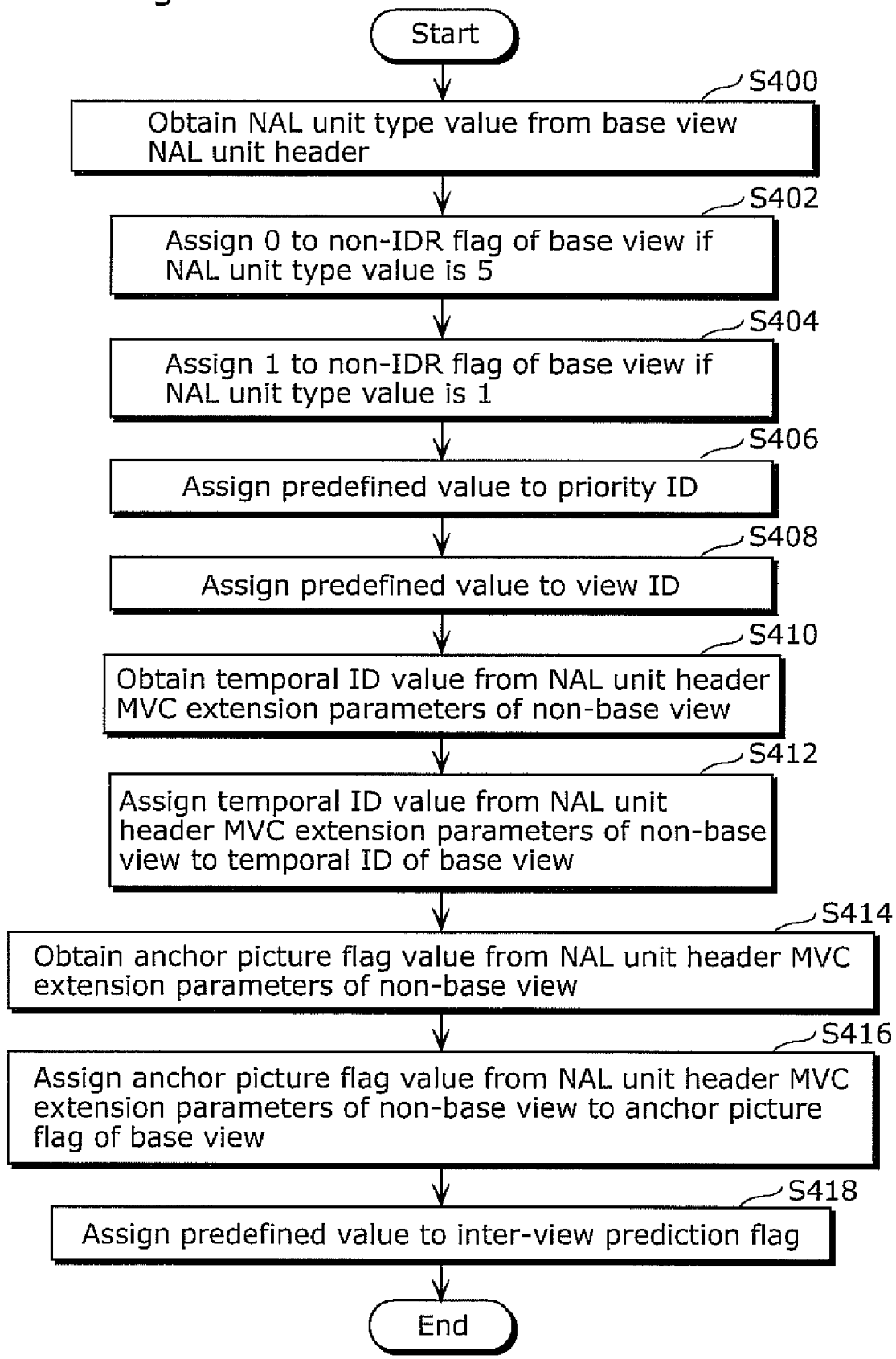
FIG. 8 is a flowchart showing processing to compute base view NAL unit header MVC extension parameters in Embodiment 2 of the present invention.

Embodiment 2 is different from Embodiment 1 in the processing of computing NAL unit header MVC extension parameters for a base view. FIG. 8 is a flowchart showing processing to compute NAL unit header MVC extension parameters for a base view in Embodiment 2 of the present invention. Examples of these parameters include a non-IDR flag (non_idr_flag), a priority ID (priority_id), a view ID (view_id), a temporal ID (temporal_id), an anchor picture flag (anchor_pic_flag), and an inter-view prediction flag (inter_view_flag).

The following describes processing executed by the base view MVC extension parameter computation unit 106 of the image coding apparatus 150. The base view MVC extension parameter computation unit 206 of the image decoding apparatus 250 executes the same processing.

First, the base view MVC extension parameter computation unit 106 reads the value of a NAL unit type (nal_unit_type) from the NAL unit header of the base view (S400).

Next, the base view MVC extension parameter computation unit 106 assigns 0 to a non-IDR flag (non_idr_flag) when the value of the NAL unit type (nal_unit_type) is 5 (S402).

Otherwise, the base view MVC extension parameter computation unit 106 assigns 1 to a non-IDR flag (non_idr_flag) when the value of the NAL unit type (nal_unit_type) is 0 (S404).

Next, base view MVC extension parameter computation unit 106 assigns a predefined value to the priority ID (priority_id) of the base view (S406). The value predefined as the value of the priority ID (priority_id) is 0.

Next, the base view MVC extension parameter computation unit 106 assigns a predefined value to the view ID (view_id) (S408). The value predefined as the value of the view ID (view_id) is also 0.

Next, the base view MVC extension parameter computation unit 106 obtains the value of the temporal ID (temporal_id) of a non-base view from the NAL unit header MVC extension parameters of the non-base view (S410).

Next, the base view MVC extension parameter computation unit 106 assigns the obtained value of the temporal ID (temporal_id) of the non-base view to the temporal ID (temporal_id) of the base view (S412).

Next, the base view MVC extension parameter computation unit 106 obtains the value of the anchor picture flag (anchor_pic_flag) from among the NAL unit header MVC extension parameters of the non-base view (S414).

Next, the base view MVC extension parameter computation unit 106 assigns the obtained value of the anchor picture flag (anchor_pic_flag) of the non-base view to the anchor picture flag (anchor_pic_flag) of the base view (S416).

Figure 9:
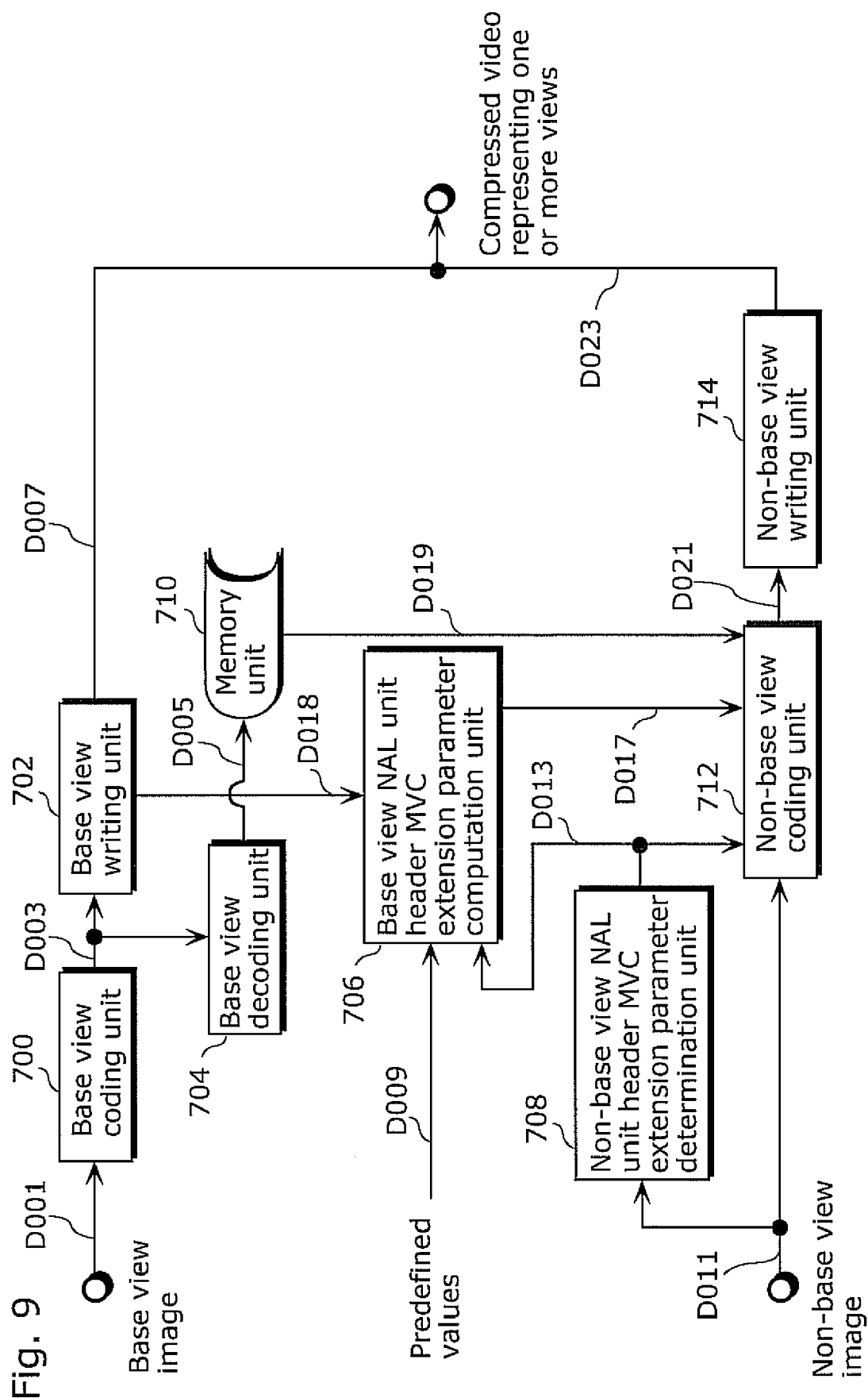
FIG. 9 is a diagram showing an example of an image coding apparatus in Embodiment 2 of the present invention.

Lastly, the base view MVC extension parameter computation unit 106 sets a predefined value to the inter-view prediction flag (inter_view_flag) of the base view (S418). The value predefined as the inter-view prediction flag (inter_view_flag) of the base view is 1. FIG. 9 is a diagram showing an example of the image coding apparatus in Embodiment 2 of the present invention. This apparatus includes a base view coding unit 700, a base view writing unit 702, a base view decoding unit 704, a base view NAL unit header MVC extension parameter computation unit 706, a non-base view NAL unit header MVC extension parameter determination unit 708, a memory unit 710, a non-base view coding unit 712, and a non-base view writing unit 714. First, a base view image D001 is input to the base view coding unit 700, and a compressed base view image D003 is output to both the base view writing unit 702 and the base view decoding unit 704. The base view decoding unit 704 reads the compressed base view image D003, and outputs the decoded base view image D005 to the memory unit 710. The base view writing unit 702 obtains the compressed base view image D003, and outputs the compressed base view images D007 in NAL units, and outputs the NAL unit type (nal_unit_type) value D018 of the base view NAL unit to the base view NAL unit header MVC extension parameter computation unit 706.

As shown in FIG. 9, a non-base view image D011 is input to both the non-base view NAL unit header MVC extension parameter determination unit 708 and the non-base view coding unit 712. The non-base view NAL unit header MVC extension parameter determination unit 708 then outputs the non-base view NAL unit header MVC extension parameters D013 to both the base view NAL unit header MVC extension parameter computation unit 706 and the non-base view coding unit 712. The base view NAL unit header MVC extension parameter computation unit 706 obtains the predefined values D009, the non-base view NAL unit header MVC extension parameters D013, and the NAL unit type (nal_unit_type) value D018 of the base view NAL unit, assigns the values to the base view NAL unit header MVC extension parameters, and outputs the base view NAL unit header MVC extension parameters D017 to the non-base view coding unit 712. The non-base view coding unit 712 then obtains a non-base view image D011, the non-base view NAL unit header MVC extension parameters D013, the base view NAL unit header MVC extension parameters D017, and a decoded base view image D019, and outputs a compressed non-base view image D021.

Lastly, the non-base view writing unit 714 obtains a compressed non-base view image D021, and outputs a compressed non-base view image D023 in the NAL unit.

An image coding apparatus shown in FIG. 9 is a specific example of the image coding apparatus 150 shown in FIG. 1. The processing performed by each of the structural elements shown in FIG. 1 is executed by a corresponding one of the structural elements shown in FIG. 9

The processing performed by the base view coding unit 100 is executed by the base view coding unit 700. The processing performed by the base view writing unit 102 is executed by the base view writing unit 702. The processing performed by the non-base view MVC extension parameter determination unit 104 is executed by the non-base view NAL unit header MVC extension parameter determination unit 708. The processing performed by the base view MVC extension parameter computation unit 106 is executed by the base view NAL unit header MVC extension parameter computation unit 706. The processing performed by the non-base view coding unit 108 is executed by the non-base view coding unit 712. The processing performed by the non-base view writing unit 110 is executed by the non-base view writing unit 714.

Figure 10:
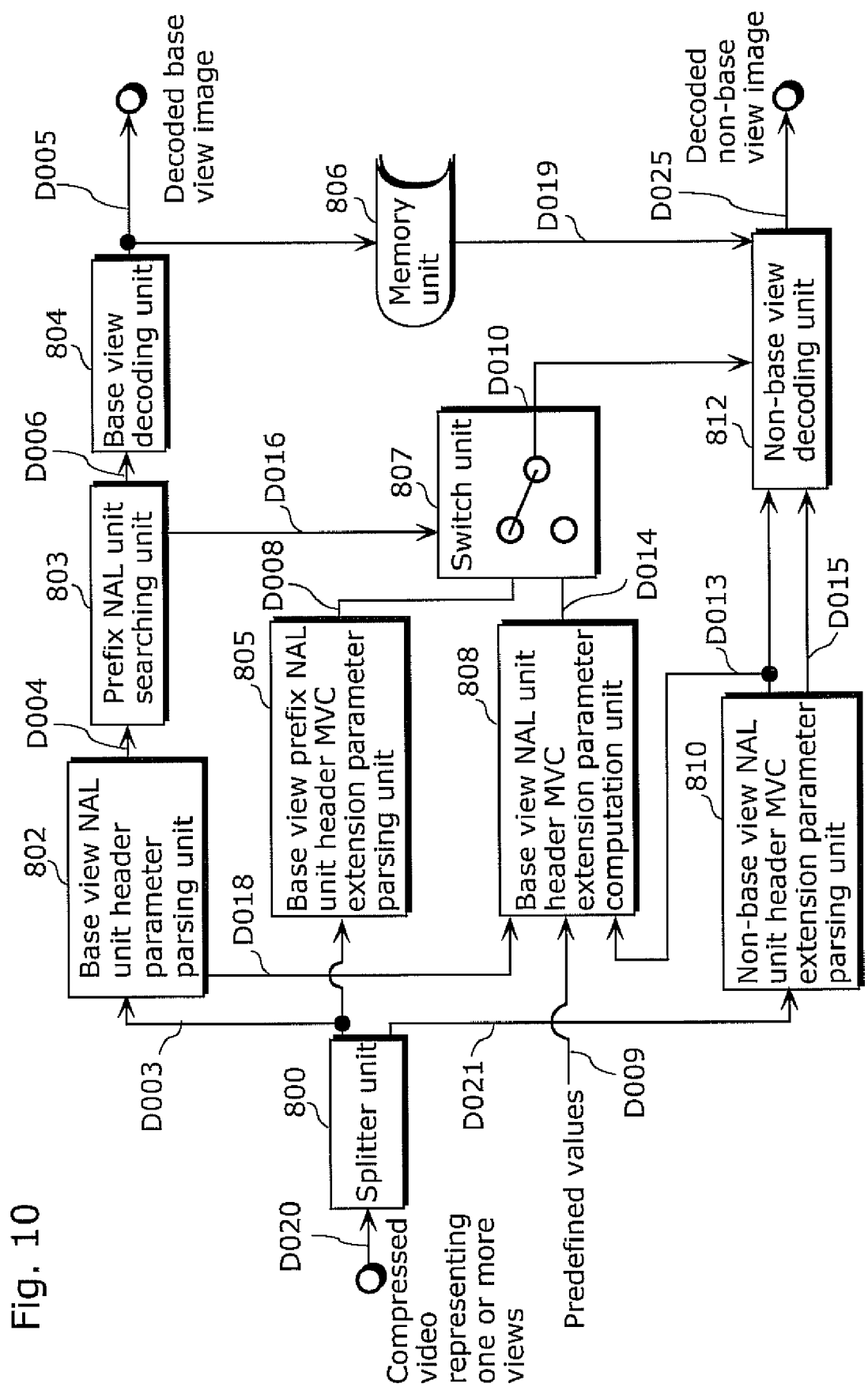
FIG. 10 is a diagram showing an example of the image decoding apparatus in Embodiment 2 of the present invention.

FIG. 10 is a diagram showing an example of the image decoding apparatus in Embodiment 2 of the present invention. The apparatus includes a splitter unit 800, a base view NAL unit header parameter parsing unit 802, a prefix NAL unit searching unit 803, a base view decoding unit 804, a base view prefix NAL unit header MVC extension parameter parsing unit 805, a memory unit 806, a switch unit 807, a base view NAL unit header MVC extension parameter computation unit 808, a non-base view NAL unit header MVC extension parameter parsing unit 810, and a non-base view decoding unit 812.

As shown in FIG. 10, the splitter unit 800 obtains a compressed video D020 of one or more views, and divides it into a compressed base view image D003 provided to the base view NAL unit header parameter parsing unit 802 and a compressed non-base view image D021 provided to the non-base view NAL unit header MVC extension parameter parsing unit 810.

The base view NAL unit header parameter parsing unit 802 obtains the compressed base view image D003, and outputs the base view NAL unit type (nal_unit_type) value D018 to the base view NAL unit header MVC extension parameter computation unit 808. The base view NAL unit header parameter parsing unit 802 also outputs the compressed base view image D004 to the prefix NAL unit searching unit 803. The prefix NAL unit searching unit 803 searches the base view for a prefix NAL unit, and outputs a signal D016 indicating the presence or absence of the prefix NAL unit to the switch unit 807. The prefix NAL unit searching unit 803 also outputs the compressed base view image D006 to the base view decoding unit 804.

The base view decoding unit 804 obtains the compressed base view image D006, and outputs a decoded base view image D005. The decoded base view image D005 is stored in the memory unit 806. If prefix NAL units are present in the compressed base view, the base view prefix NAL unit header MVC extension parameter parsing unit 805 reads the compressed base view image D003, and outputs the base view NAL unit header MVC extension parameters D008.

The non-base view NAL unit header MVC extension parameter parsing unit 810 obtains the compressed non-base view D021, and outputs the non-base view NAL unit header MVC extension parameters D013 to both the base view NAL unit header MVC extension parameter computation unit 808 and the non-base view decoding unit 812. The non-base view NAL unit header MVC extension parameter parsing unit 810 also outputs the compressed non-base view image D015 to the non-base view decoding unit 812. The base view NAL unit header MVC extension parameter computation unit 808 obtains the predefined values D009, the base view NAL unit type (nal_unit_type) D018 and the non-base view NAL unit header MVC extension parameters D013, assigns the values to the base view NAL unit header MVC extension parameters, and outputs the base view NAL unit header MVC extension parameters D014 to the switch unit 807. Whether prefix NAL units are present in or absent from the compressed base view is determined based on a signal D016 signaled by the prefix NAL unit searching unit 803. If no prefix NAL units are present in the base view, the switch unit 807 passes the computed base view NAL unit header MVC extension parameters D014 to the non-base view decoding unit 812. If prefix NAL units are present, the switch unit 807 passes the parsed base view NAL unit header MVC extension parameters D008 to the non-base view decoding unit 812.

Finally, the non-base view decoding unit 812 obtains the decoded base view image D019, base view NAL unit header MVC extension parameters D010, parsed non-base view NAL unit header MVC extension parameters D013, and a compressed non-base view image D015, and outputs the non-base view decoded image D025.

An image decoding apparatus shown in FIG. 10 is a specific example of the image decoding apparatus 250 shown in FIG. 3. The processing performed by each of the structural elements shown in FIG. 3 is executed by a corresponding one of the structural elements shown in FIG. 10.

The processing performed by the base view NAL unit parsing unit 200 and the base view decoding unit 202 is executed by the base view decoding unit 804. The processing performed by the non-base view MVC extension parameter parsing unit 204 is executed by the non-base view NAL unit header MVC extension parameter parsing unit 810. The processing performed by the prefix NAL unit searching unit 205 is executed by the prefix NAL unit searching unit 803. The processing performed by the base view MVC extension parameter parsing unit 207 is executed by the base view prefix NAL unit header MVC extension parameter parsing unit 805. The processing performed by the base view MVC extension parameter computation unit 206 is executed by the base view NAL unit header MVC extension parameter computation unit 808. The processing performed by the non-base view NAL unit parsing unit 208 and the non-base view decoding unit 210 is executed by the non-base view decoding unit 812. As described above, the image coding apparatus 150 in Embodiment 2 codes a multiview video without prefix NAL units as in Embodiment 1. The image decoding apparatus 250 in Embodiment 2 is capable of decoding a coded multiview video irrespective of whether or not the coded multiview video includes prefix NAL units as in Embodiment 1. Furthermore, the image coding apparatus 150 and image decoding apparatus 250 in Embodiment 2 are capable of computing more accurate MVC extension parameters using base view NAL unit types when computing base view MVC extension parameters.

As in Embodiment 1, the processing flow shown in FIG. 8 is exemplary. Thus, the processing flows executed by the image coding apparatus 150 and the image decoding apparatus 250 are not limited to the processing flow shown in FIG. 8. For example, the image coding apparatus 150 and the image decoding apparatus 250 may execute the processing shown in FIG. 8 in an order different from the order of the processing shown in FIG. 8, or otherwise may execute the processing shown in FIG. 8 in parallel.

In addition, the predefined values to be assigned to the priority ID (priority_id), view ID (view_id), and inter-view prediction flag (view_inter_flag) may be values different from the values shown in Embodiment 2.

Furthermore, there may be plural non-base views as in Embodiment 1.

Embodiment 3

Next, Embodiment 3 is described.

Figure 11:
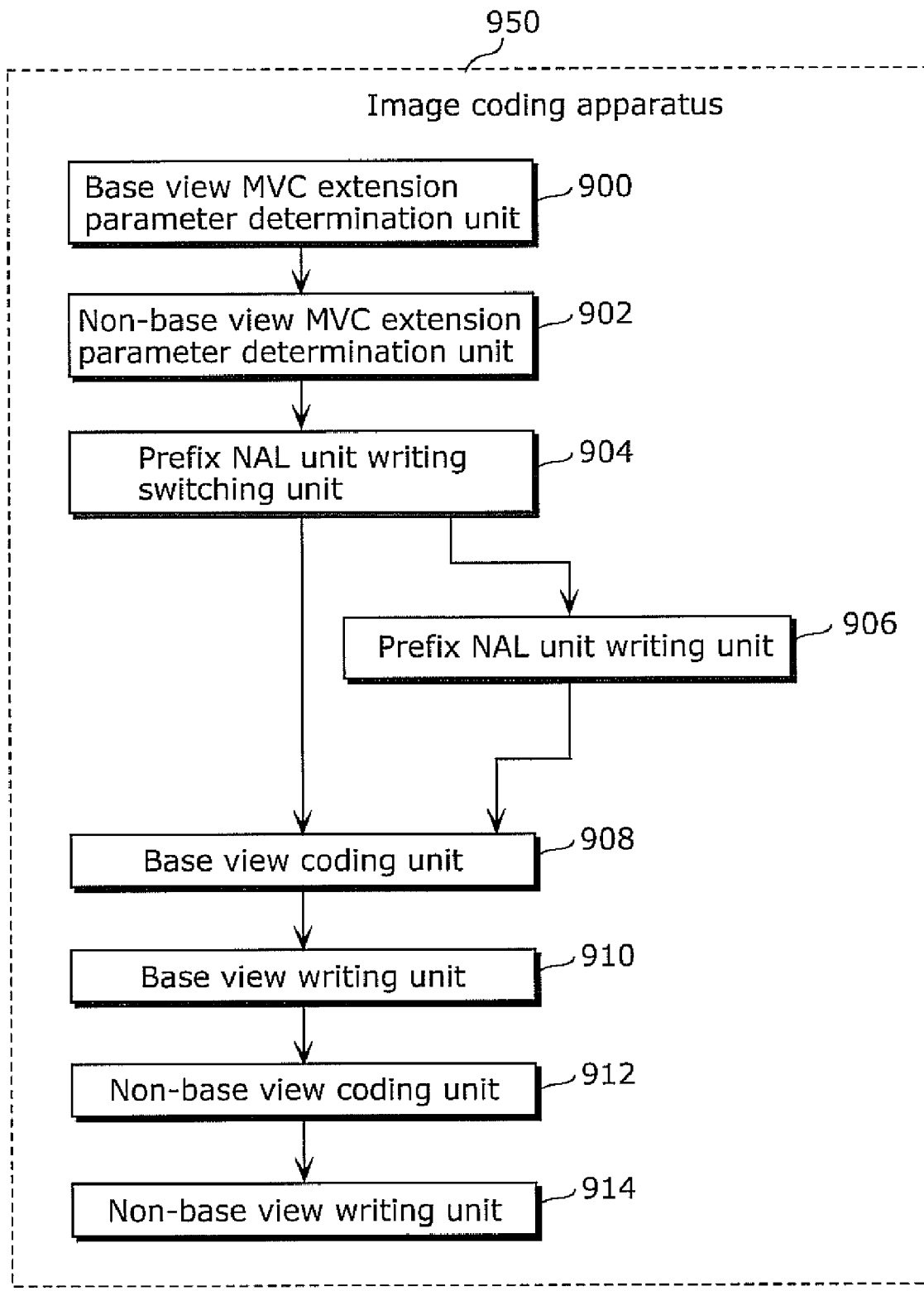
FIG. 11 is a structural diagram of constituent elements of an image coding apparatus in Embodiment 3 of the present invention.

FIG. 11 is a structural diagram of constituent elements of an image coding apparatus in Embodiment 3 of the present invention. An image coding apparatus 950 shown in FIG. 11 includes a base view MVC extension parameter determination unit 900, a non-base view MVC extension parameter determination unit 902, a prefix NAL unit writing switching unit 904, a prefix NAL unit writing unit 906, a base view coding unit 908, a base view writing unit 910, a non-base view coding unit 912, and a non-base view writing unit 914. Each of the processing units executes a corresponding one of the following processes.

Figure 12:
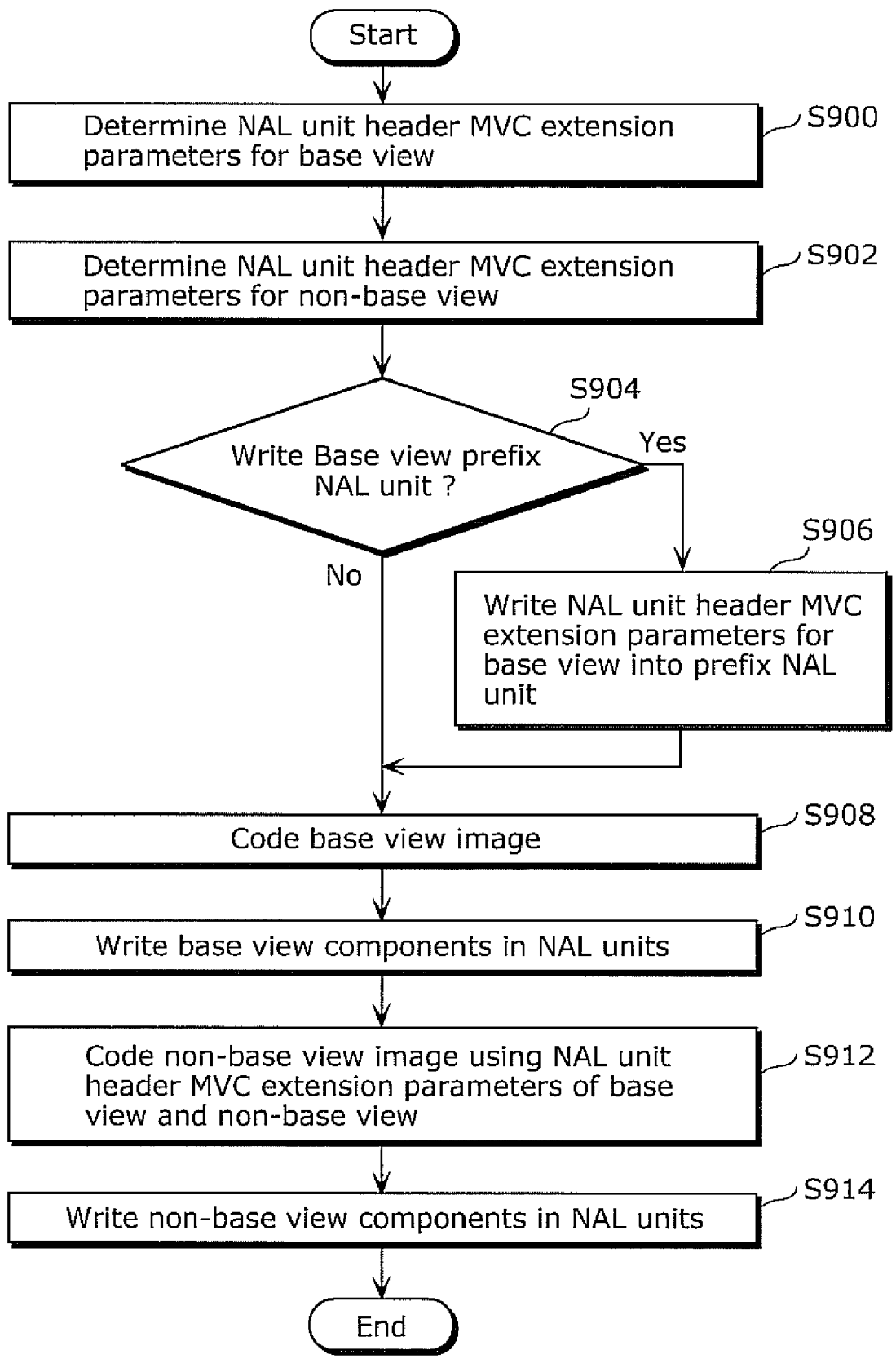
FIG. 12 is a flowchart showing a variation of coding processing in Embodiment 3 of the present invention.

FIG. 12 is a flowchart showing coding processing in Embodiment 3 of the present invention.

First, the base view MVC extension parameter determination unit 900 determines NAL unit header MVC extension parameters of a base view (S900). Examples of these parameters include a non-IDR flag (non_idr_flag), a priority ID (priority_id), a view ID (view_id), a temporal ID (temporal_id), an anchor picture flag (anchor_pic_flag), and an inter-view prediction flag (inter_view_flag).

Next, the non-base view MVC extension parameter determination unit 902 determines NAL unit header MVC extension parameters of a non-base view (S902). Examples of these parameters include a non-IDR flag (non_idr_flag), a priority ID (priority_id), a view ID (view_id), a temporal ID (temporal_id), an anchor picture flag (anchor_pic_flag), and an inter-view prediction flag (inter_view_flag). Next, the prefix NAL unit writing switching unit 904 switches between writing and not writing base view NAL unit header MVC extension parameters into the prefix NAL units (S904). For example, the prefix NAL unit writing switching unit 904 switches between writing and not writing the base view NAL unit header MVC extension parameters into the prefix NAL units, based on preset information.

Here, in the case where the prefix NAL unit writing switching unit 904 switches to write the base view NAL unit header MVC extension parameters into the prefix NAL unit (Yes in S904), the prefix NAL unit writing unit 906 writes the base view NAL unit header MVC extension parameters into the prefix NAL unit (S906).

In the opposite case where the prefix NAL unit writing switching unit 904 switches not to write the base view NAL unit header MVC extension parameters into the prefix NAL units (No in S904), the prefix NAL unit writing unit 906 does not write the base view NAL unit header MVC extension parameters into the prefix NAL units. In short, no prefix NAL units are generated.

Next, the base view coding unit 908 codes a base view image (S908). The base view image is coded using the multiview video coding standard. The base view image coded using the multiview video coding standard can be decoded according to the Advanced Video Coding standard.

Next, the base view writing unit 910 writes coded base view components in NAL units (S910).

Next, the non-base view coding unit 912 codes a non-base view image using the NAL unit header MVC extension parameters of the base view and non-base view (S912).

Lastly, the non-base view writing unit 914 writes non-base view components in NAL units (S914).

Figure 13:
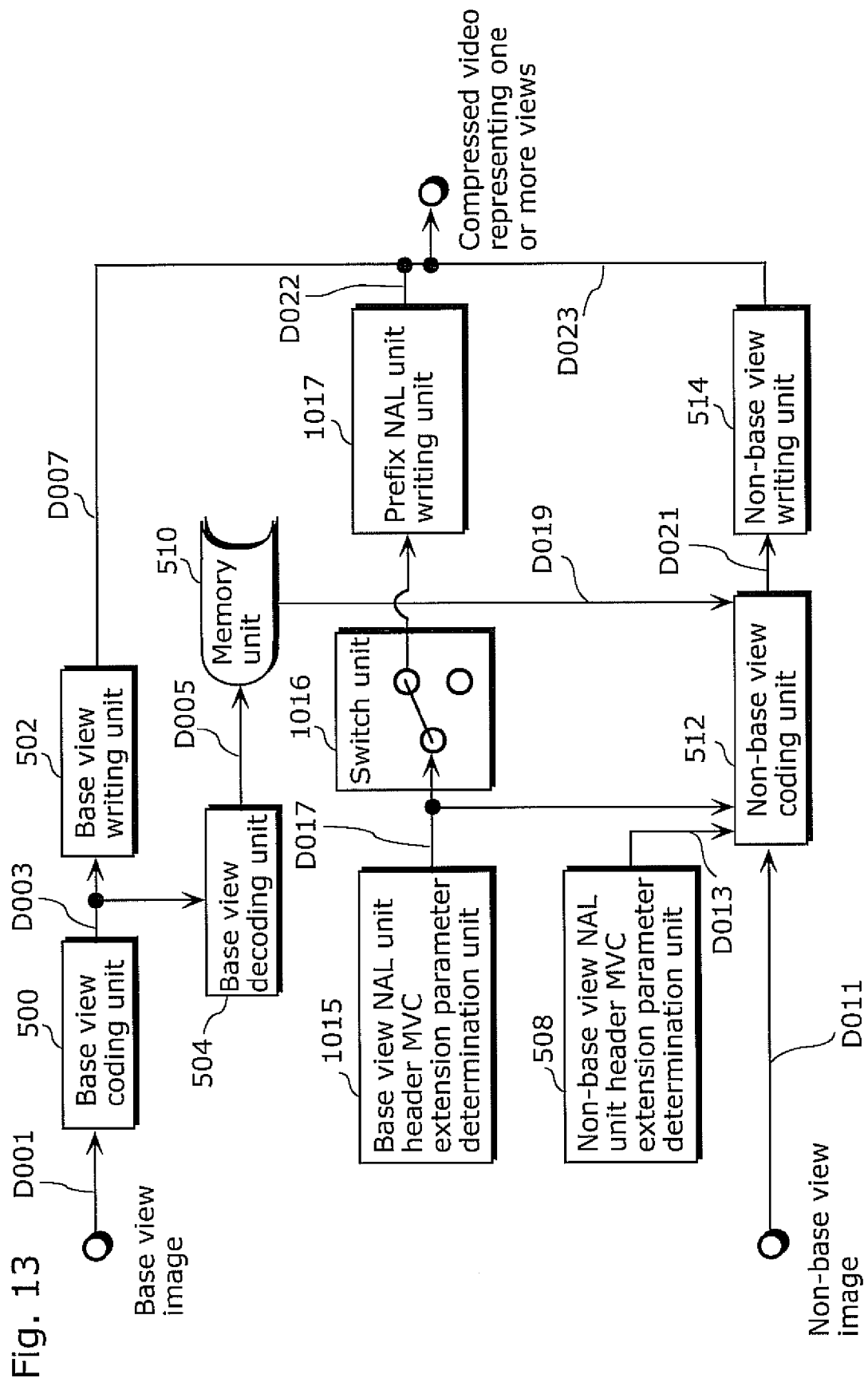
FIG. 13 is a diagram showing an example of an image coding apparatus in Embodiment 3 of the present invention.

FIG. 13 is a diagram showing an example of the image coding apparatus in Embodiment 3 of the present invention. This apparatus includes a base view coding unit 500, a base view writing unit 502, a base view decoding unit 504, a base view NAL unit header MVC extension parameter determination unit 1015, a non-base view NAL unit header MVC extension parameter determination unit 508, a memory unit 510, a non-base view coding unit 512, a non-base view writing unit 514, a switch unit 1016, and a prefix NAL unit writing unit 1017.

The base view NAL unit header MVC extension parameter determination unit 1015 is added instead of the base view NAL unit header MVC extension parameter computation unit 506 to the example shown in FIG. 6. The switch unit 1016 and the prefix NAL unit writing unit 1017 are further added thereto.

The base view NAL unit header MVC extension parameter determination unit 1015 sets a value to the base view NAL unit header MVC extension parameter D017, and outputs the base view NAL unit header MVC extension parameters D017 to the non-base view coding unit 512.

The non-base view NAL unit header MVC extension parameter determination unit 508 sets a value to a non-base view NAL unit header MVC extension parameters D013, and outputs the non-base view NAL unit header MVC extension parameters D013 to the non-base view coding unit 512.

The base view image D001 is input to the base view coding unit 500, and a compressed base view image D003 is output to both the base view writing unit 502 and the base view decoding unit 504. The base view decoding unit 504 reads the compressed base view image D003, and outputs the decoded base view image D005 to the memory unit 510.

The non-base view image D011 is input to the non-base view coding unit 512. The non-base view coding unit 512 then obtains a non-base view image D011, the non-base view NAL unit header MVC extension parameters D013, the base view NAL unit header MVC extension parameters D017, and a decoded base view image D019, and outputs a compressed non-base view image D021.

Lastly, the base view writing unit 502 and the non-base view writing unit 514 obtain a compressed base view image D003 and a compressed non-base view image D021, respectively, and output a compressed base view image D007 and a compressed non-base view image D023 in the NAL unit, respectively.

In this way, a compressed video representing one or more views without prefix NAL units is generated.

In the case where the setting is switched to include a prefix NAL unit, the switch unit 1016 outputs the base view NAL unit header MVC extension parameters D017 from the base view NAL unit header MVC extension parameter determination unit 1015 to the prefix NAL unit writing unit 1017. The prefix NAL unit writing unit 1017 writes the base view NAL unit header MVC extension parameters into the prefix NAL unit, and outputs the prefix NAL unit D022.

In this way, a compressed video representing one or more views with such prefix NAL units is generated.

An image coding apparatus shown in FIG. 13 is a specific example of the image coding apparatus 950 shown in FIG. 11. The processing performed by each of the structural elements shown in FIG. 11 is executed by a corresponding one of the structural elements shown in FIG. 13

For example, the processing performed by the base view MVC extension parameter determination unit 900 is executed by the base view NAL unit header MVC extension parameter determination unit 1015. The processing performed by the non-base view MVC extension parameter determination unit 902 is executed by the non-base view NAL unit header MVC extension parameter determination unit 508. The processing performed by the prefix NAL unit writing switching unit 904 is executed by the switch unit 1016. The processing performed by the prefix NAL unit writing unit 906 is executed by the prefix NAL unit writing unit 1017. The processing performed by the base view coding unit 908 is executed by the base view coding unit 500. The processing performed by the base view writing unit 910 is executed by the base view writing unit 502. The processing performed by the non-base view coding unit 912 is executed by the non-base view coding unit 512. The processing performed by the non-base view writing unit 110 is executed by the non-base view writing unit 514.

As described above, the image coding apparatus 950 in Embodiment 3 is capable of switching the presence or absence of prefix NAL units in coding a multiview video. Furthermore, the image coding apparatus 950 in Embodiment 3 determines the MVC extension parameters of a base view and a non-base view. Stated differently, the image coding apparatus 950 is not required to compute the base view MVC extension parameters.

Furthermore, the image coding apparatus 950 is not required to determine the base view MVC extension parameters from the non-base view MVC extension parameters. The image coding apparatus 950 can use the base view MVC extension parameters determined independently when coding the corresponding non-base view.

Furthermore, even a legacy AVC decoder can decode the base view included in the coded multiview video as in Embodiments 1 and 2. The image decoding apparatus 250 in Embodiments 1 and 2 is capable of decoding all the views included in the multiview video coded by the image coding apparatus 950.

The image coding apparatus 950 switches between filling or not filling prefix NAL units. However, it may be assumed that the image coding apparatus 950 does not fill the prefix NAL units. In this case, there is no need to include the prefix NAL unit writing switching unit 904, the prefix NAL unit writing unit 906, and the processing performed thereby.

As in Embodiments 1 and 2, the processing flow shown in FIG. 12 is exemplary. Thus, the processing flow executed by the image coding apparatus 950 is not limited to the processing flow shown in FIG. 12. For example, the image coding apparatus 950 may execute the processing shown in FIG. 12 in an order different from the order of the processing shown in FIG. 12, or otherwise may execute the processing shown FIG. 12 in parallel.

In particular, the processing of determining the base view MVC extension parameters (S900) and the processing of determining the non-base view MVC extension parameters (S902) may be performed in the inverse order. It is only necessary that the processing of determining these MVC extension parameters (S900 and S902) is executed before the processing of coding a non-base view image (S912) and the processing of writing the MVC extension parameters (S906 and S914).

As in Embodiments 1 and 2, the respective priority ID (priority_id), view ID (view_id), inter-view prediction flag (inter_view_flag) may be assigned with predefined values when the base view MVC extension parameters are determined (S900). For example, the priority ID (priority_id) is assigned with 0, the inter-view prediction flag (inter_view_flag) is assigned with 0, and the inter-view prediction flag (inter_view_flag) is assigned with 1.

Likewise, the respective non-IDR flag (non_idr_flag), temporal ID (temporal_id), and anchor picture flag (anchor_pic_flag) may be assigned such that the base view side and the non-base view side have the same values when the MVC extension parameters of the base view and non-base view are determined (S900 and S902). Among these, the non-IDR flag (non_idr_flag) of the base view may be determined based on the NAL unit type as in Embodiment 2.

Furthermore, there may be plural non-base views as in Embodiments 1 and 2.

As described above, the image coding apparatuses and image decoding apparatuses in Embodiments 1, 2, and 3 are capable of coding and decoding, respectively, a multiview video even when no prefix NAL units are used. In this way, even a legacy AVC decoder incapable of decoding a base view due to prefix NAL units can decode a base view. Furthermore, it is also possible to use a conventional bitstream generated by a legacy AVC encoder as a base view of a multiview video.

For example, there is a case where a 2D animation video coded by a legacy AVC encoder is written in a BD (Blu-ray Disc). A 2D animation video with parallax written in the BD may be coded and distributed via the Internet. In this case, a multiview video is made up with a base view that is the 2D animation video written in the BD and a non-base view that is the video generated based on the base view with consideration of parallax.

The image decoding apparatus in each Embodiment is capable of decoding a multiview video generated in this way. The decoded multiview video is reproduced as a 3D animation video. As described above, there is no need to add prefix NAL units to a base view stream. Thus, it is easy to use conventional resources. Furthermore, it is also easy to add another view to a stream generated from a single view. For this reason, for example, another coded view may be provided using another recording medium.

Figure 14:
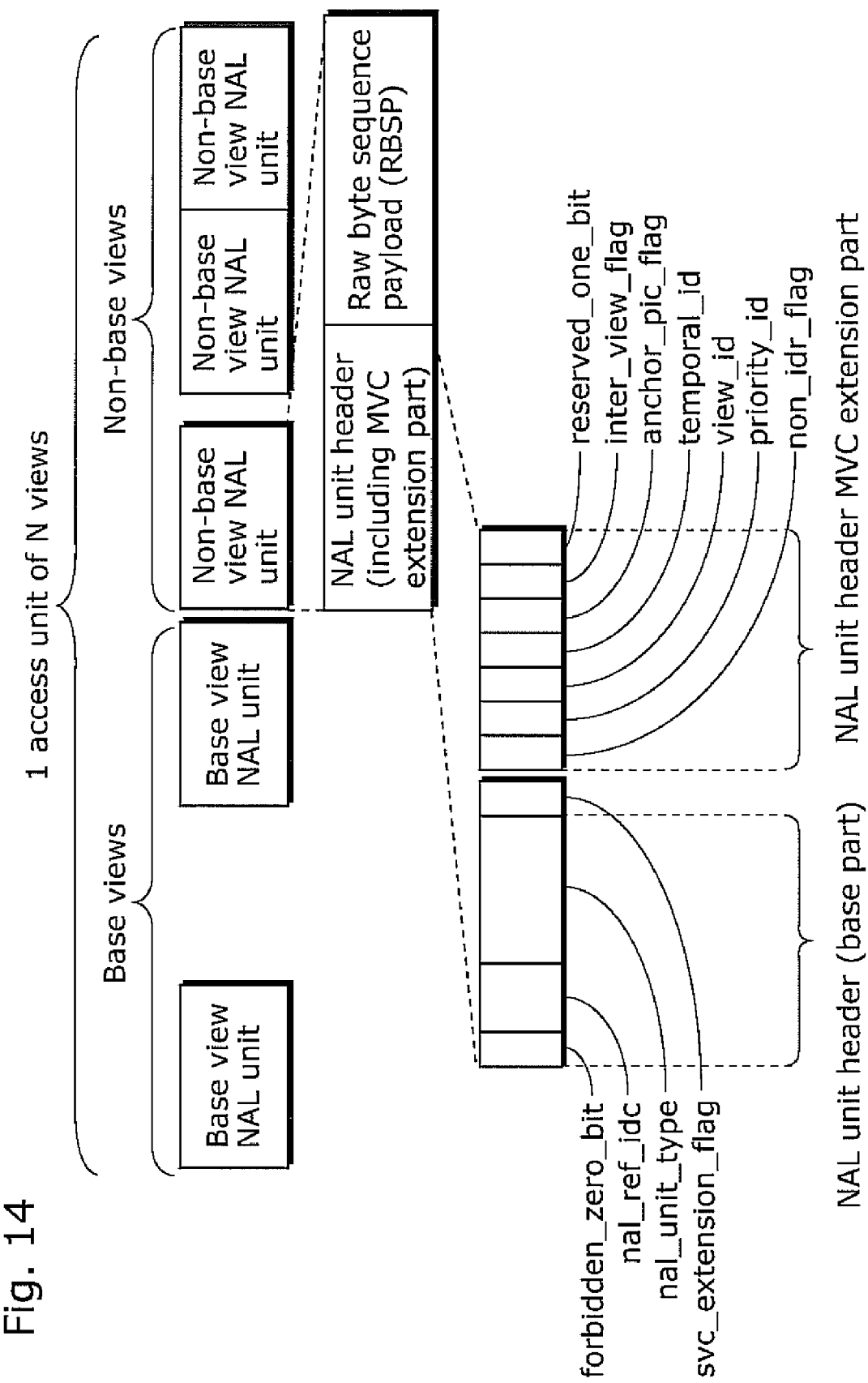
FIG. 14 is a diagram showing an example of a data structure of a coded stream in each of the Embodiments of the present invention.

FIG. 14 is a diagram showing an example of data structures of coded streams in the respective Embodiments of the present invention. The image coding apparatus in each Embodiment is capable of generating a stream without prefix NAL units as shown in FIG. 14 by coding a multiview video. Furthermore, the image decoding apparatus in each Embodiment is capable of decoding a multiview video from a stream without prefix NAL units as shown in FIG. 14, using MVC extension parameters included in a non-base view, and the like.

Furthermore, when a base view is already coded without prefix NAL units, the image coding apparatus in each Embodiment may code only the corresponding non-base view. The image decoding apparatus in each Embodiment is capable of computing MVC extension parameters of the base view from the MVC extension parameters of the non-base view, and thereby decoding, as a multiview video, the base view coded without prefix NAL units and the newly coded non-base view.

Embodiment 4

The processing described in Embodiment 1 can be simply implemented by an independent computer system, by recording, in a recording medium, a program for implementing the configurations for the image coding method and the image decoding method described in Embodiment 1. The recording medium may be any recording medium as long as the program can be recorded, such as a magnetic disk, an optical disk, a magnetic optical disk, an IC card, and a semiconductor memory.

Hereinafter, the applications to the image coding method and the image decoding method described in Embodiment 1 and systems using thereof will be described.

Figure 15:
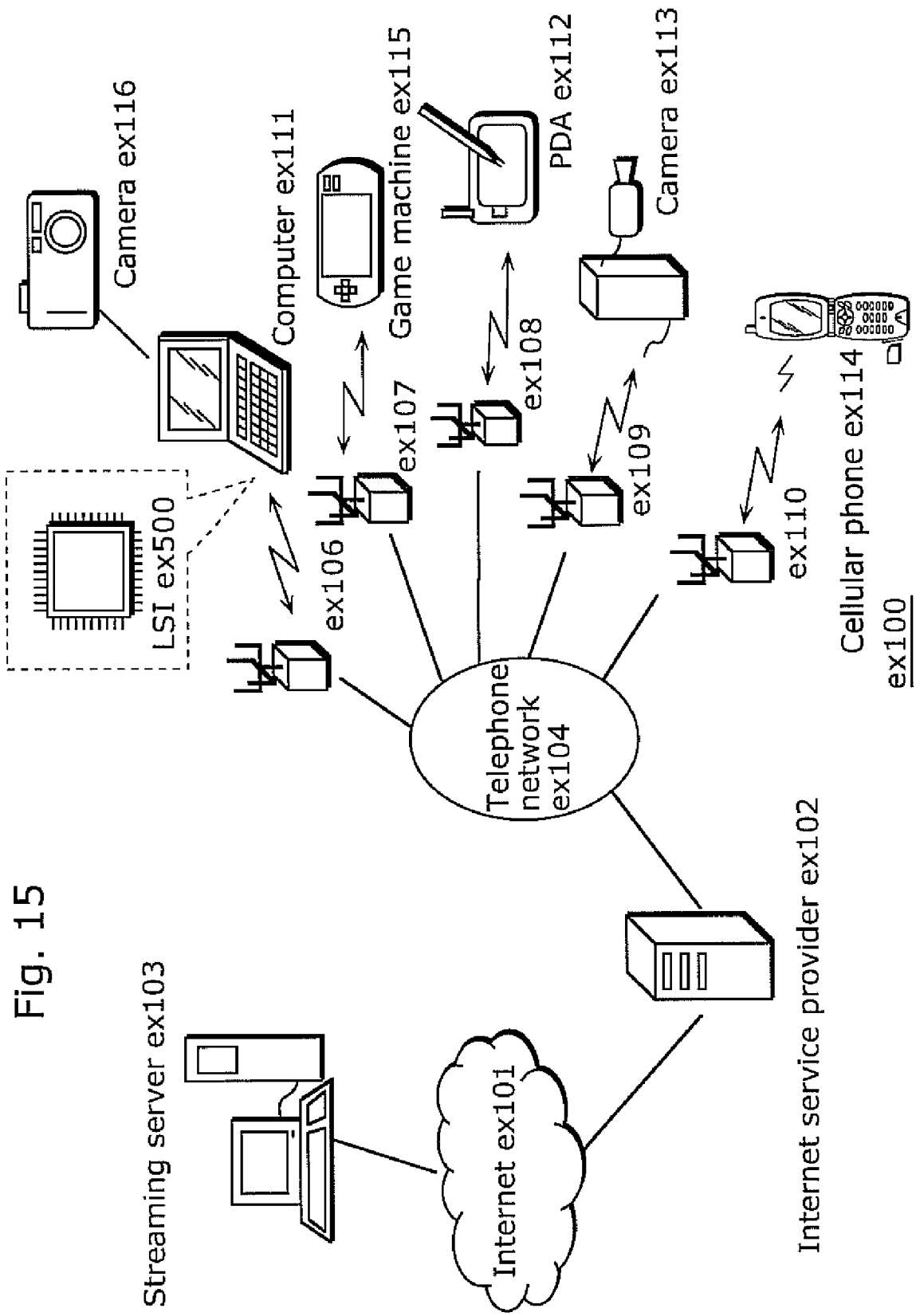
FIG. 15 schematically shows an overall configuration of a content providing system for implementing content distribution services.

FIG. 15 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via an Internet ex101, an Internet service provider ex102, a telephone network ex104, as well as the base stations ex106 to ex110.

However, the configuration of the content providing system ex100 is not limited to the configuration shown in FIG. 15, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in Embodiment 1, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

When each of the devices included in the content providing system ex100 performs coding and decoding, the image coding method and the image decoding method shown in Embodiment 1 may be used.

The cellular phone ex114 will be described as an example of such a device.

Figure 16:
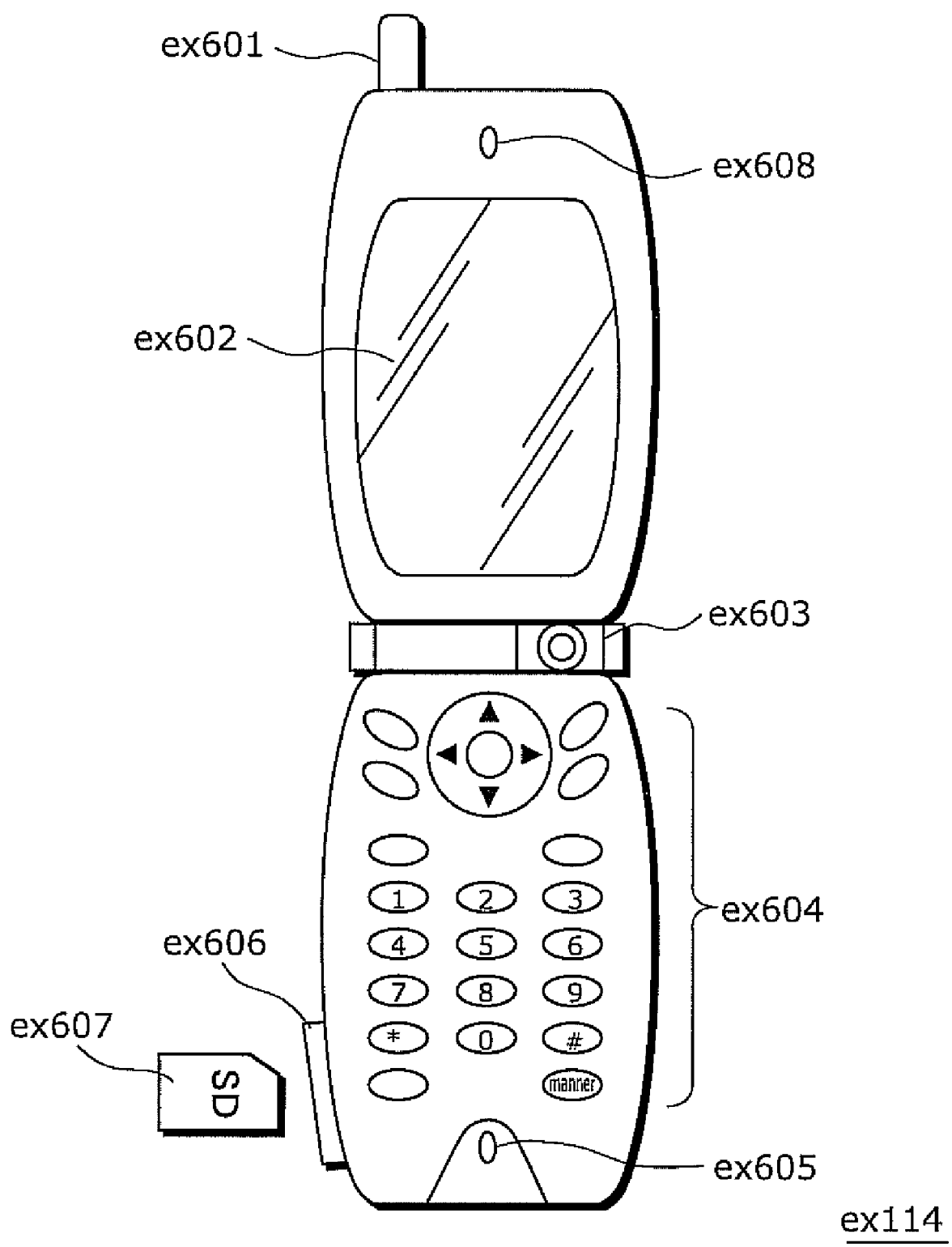
FIG. 16 shows an external view of a cellular phone.

FIG. 16 illustrates the cellular phone ex114 that uses the image coding method and the image decoding method described in Embodiment 1. The cellular phone ex114 includes: an antenna ex601 for transmitting and receiving radio waves through the base station ex110; a camera unit ex603 such as a CCD camera capable of capturing moving and still images; a display unit ex602 such as a liquid crystal display for displaying the data such as decoded video captured by the camera unit ex603 or received by the antenna ex601; a main body unit including a set of operation keys ex604; an audio output unit ex608 such as a speaker for output of audio; an audio input unit ex605 such as a microphone for input of audio; a recording medium ex607 for recording coded or decoded data including data of captured moving or still images, data of received e-mails, and data of moving or still images; and a slot unit ex606 for enabling the cellular phone ex114 to attach the recording medium ex607. The recording medium ex607 is a medium that stores a flash memory device within a plastic case, for example, an SD Card. The flash memory device is one type of Electrically Erasable and Programmable Read-Only Memory (EEPROM) which is a non-volatile memory that is electrically rewritable and erasable.

Figure 17:
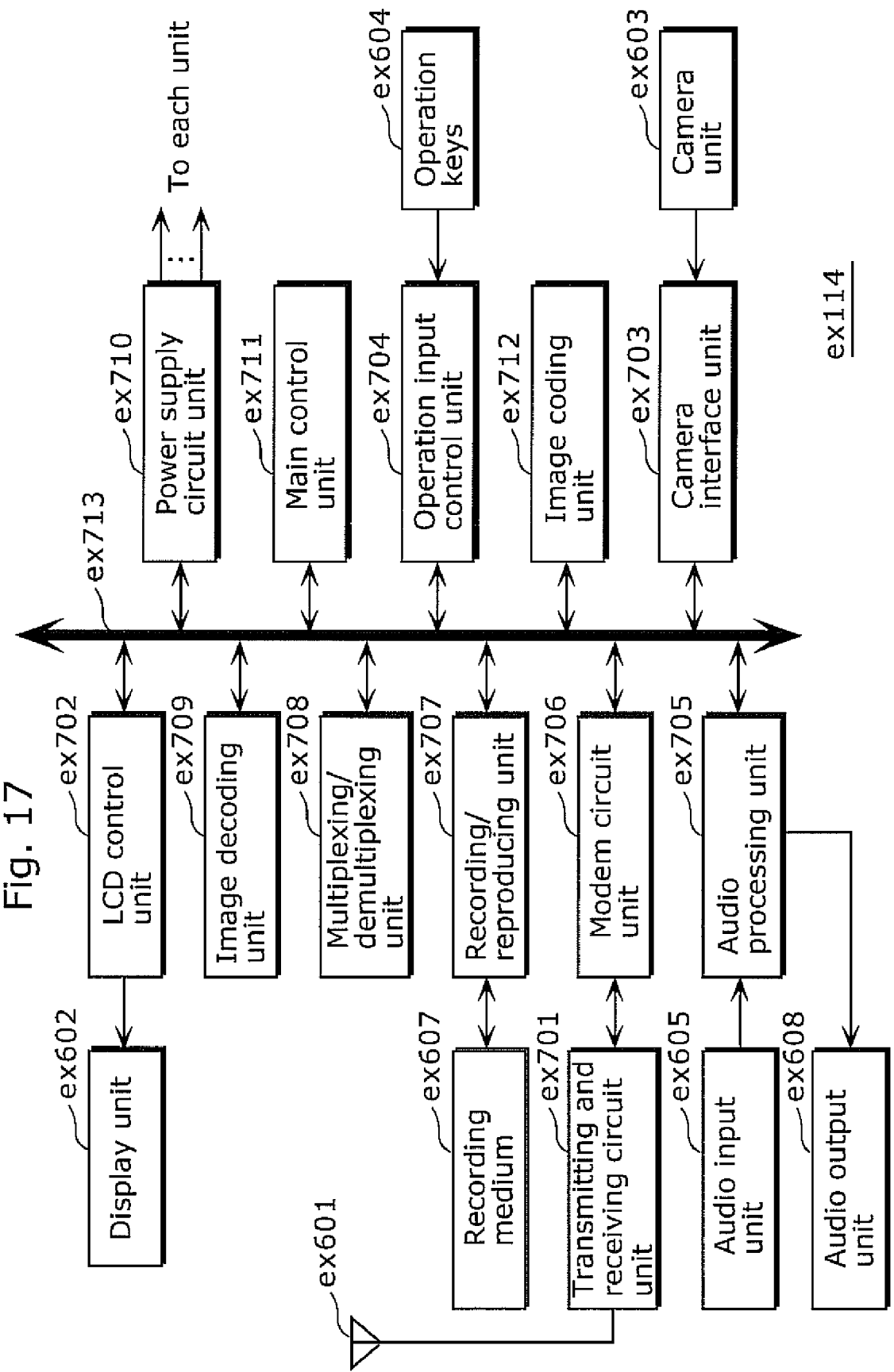
FIG. 17 is a block diagram showing an example of a configuration of the cellular phone.

Next, the cellular phone ex114 will be described with reference to FIG. 17. In the cellular phone ex114, a main control unit ex711 designed to control overall each unit of the main body including the display unit ex602 as well as the operation keys ex604 is connected mutually, via a synchronous bus ex713, to a power supply circuit unit ex710, an operation input control unit ex704, an image coding unit ex712, a camera interface unit ex703, a liquid crystal display (LCD) control unit ex702, an image decoding unit ex709, a multiplexing/demultiplexing unit ex708, a recording/reproducing unit ex707, a modem circuit unit ex706, and an audio processing unit ex705.

When a call-end key or a power key is turned ON by a user's operation, the power supply circuit unit ex710 supplies the respective units with power from a battery pack so as to activate the cell phone ex114 that is digital and is equipped with the camera.

In the cellular phone ex114, the audio processing unit ex705 converts the audio signals collected by the audio input unit ex605 in voice conversation mode into digital audio data under the control of the main control unit ex711 including a CPU, ROM, and RAM. Then, the modem circuit unit ex706 performs spread spectrum processing on the digital audio data, and the transmitting and receiving circuit unit ex701 performs digital-to-analog conversion and frequency conversion on the data, so as to transmit the resulting data via the antenna ex601. In addition, in the cellular phone ex114, the transmitting and receiving circuit unit ex701 amplifies the data received by the antenna ex601 in voice conversation mode and performs frequency conversion and the analog-to-digital conversion on the data. Then, the modem circuit unit ex706 performs inverse spread spectrum processing on the data, and the audio processing unit ex705 converts it into analog audio data, so as to output it via the audio output unit ex608.

Furthermore, when an e-mail in data communication mode is transmitted, text data of the e-mail inputted by operating the operation keys ex604 of the main body is sent out to the main control unit ex711 via the operation input control unit ex704. The main control unit ex711 causes the modem circuit unit ex706 to perform spread spectrum processing on the text data, and the transmitting and receiving circuit unit ex701 performs the digital-to-analog conversion and the frequency conversion on the resulting data to transmit the data to the base station ex110 via the antenna ex601.

When image data is transmitted in data communication mode, the image data captured by the camera unit ex603 is supplied to the image coding unit ex712 via the camera interface unit ex703. When the image data is not transmitted, the image data captured by the camera unit ex603 can be displayed directly on the display unit ex602 via the camera interface unit ex703 and the LCD control unit ex702.

The image coding unit ex712 including the image coding apparatus as described in the present invention compresses and codes the image data supplied from the camera unit ex603 using the coding method employed by the image coding apparatus as shown in Embodiment 1 so as to transform the data into coded image data, and sends the data out to the multiplexing/demultiplexing unit ex708. Furthermore, the cellular phone ex114 simultaneously sends out, as digital audio data, the audio received by the audio input unit ex605 during the capturing with the camera unit ex603 to the multiplexing/demultiplexing unit ex708 via the audio processing unit ex705.

The multiplexing/demultiplexing unit ex708 multiplexes the coded image data supplied from the image coding unit ex712 and the audio data supplied from the audio processing unit ex705, using a predetermined method. Then, the modem circuit unit ex706 performs spread spectrum processing on the multiplexed data obtained by the multiplexing/demultiplexing unit ex708. After the digital-to-analog conversion and frequency conversion on the data, the transmitting and receiving circuit unit ex701 transmits the resulting data via the antenna ex601.

When receiving data of a video file which is linked to a Web page and others in data communication mode, the modem circuit unit ex706 performs inverse spread spectrum processing on the data received from the base station ex110 via the antenna ex601, and sends out the multiplexed data obtained as a result of the inverse spread spectrum processing to the multiplexing/demultiplexing unit ex708.

In order to decode the multiplexed data received via the antenna ex601, the multiplexing/demultiplexing unit ex708 demultiplexes the multiplexed data into a bitstream of image data and that of audio data, and supplies the coded image data to the image decoding unit ex709 and the audio data to the audio processing unit ex705, respectively via the synchronous bus ex713.

Next, the image decoding unit ex709 including the image decoding apparatus as described in the present invention decodes the bitstream of the image data using the decoding method corresponding to the coding method as shown in Embodiment 1 so as to generate reproduced video data, and supplies this data to the display unit ex602 via the LCD control unit ex702. Thus, the video data included in the video file linked to the Web page, for instance, is displayed. Simultaneously, the audio processing unit ex705 converts the audio data into analog audio data, and supplies the data to the audio output unit ex608. Thus, the audio data included in the video file linked to the Web page, for instance, is reproduced.

Figure 18:
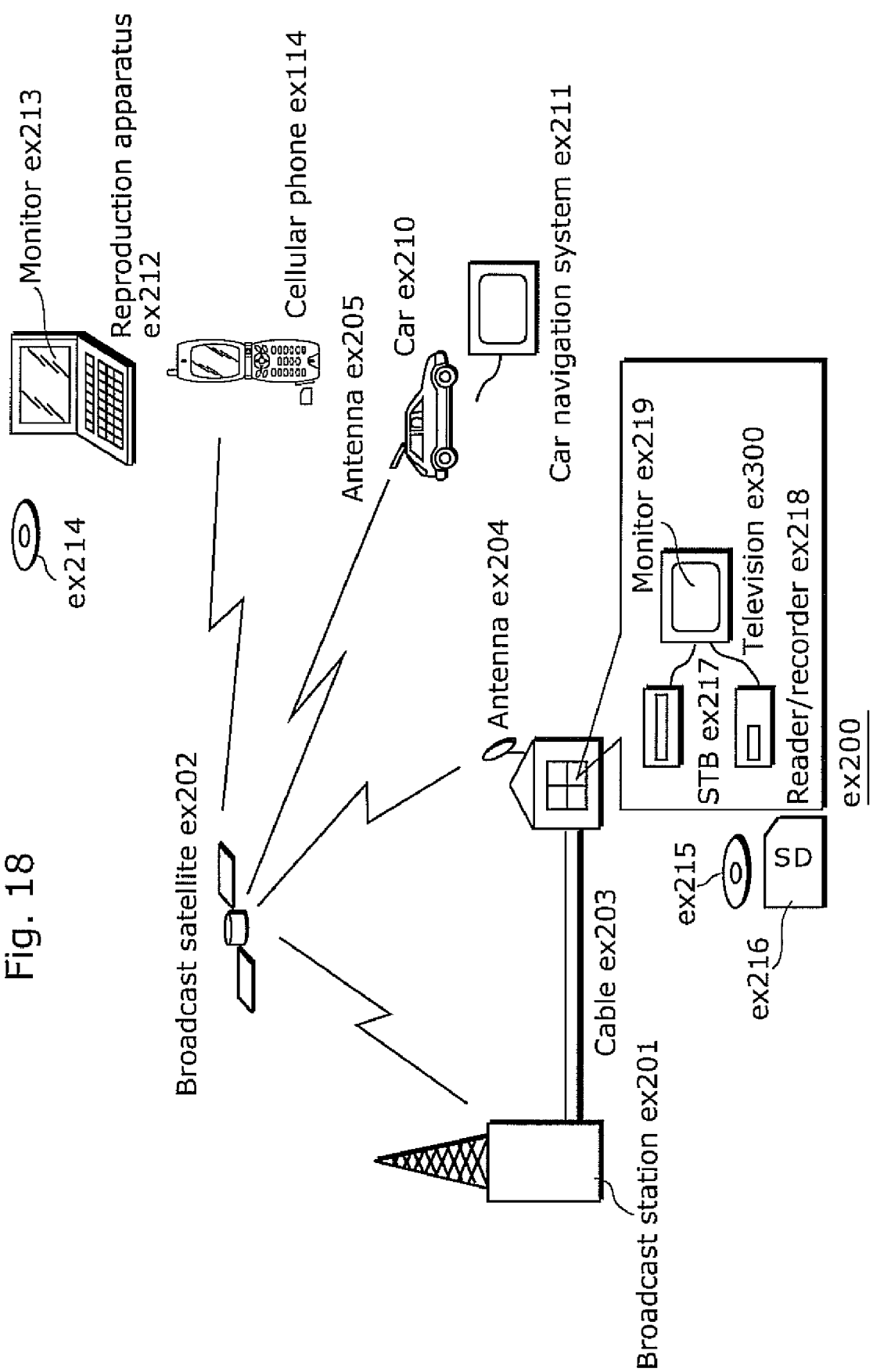
FIG. 18 schematically shows an example of an overall configuration of a digital broadcasting system.

The present invention is not limited to the above-mentioned system because terrestrial or satellite digital broadcasting has been in the news lately, and at least either the image coding apparatus or the image decoding apparatus described in Embodiment 1 can be incorporated into a digital broadcasting system as shown in FIG. 18. More specifically, a broadcast station ex201 communicates or transmits, via radio waves to a broadcast satellite ex202, audio data, video data, or a bitstream obtained by multiplexing the audio data and the video data. Upon receipt of the bitstream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217 decodes a coded bitstream and reproduces the decoded bitstream. Furthermore, a reader/recorder ex218 that reads and decodes such a bitstream obtained by multiplexing image data and audio data that are recorded on recording media ex215 and 216, such as a CD and a DVD may include the image decoding apparatus as shown in Embodiment 1. In this case, the reproduced video signals are displayed on a monitor ex219. It is also possible to implement the image decoding apparatus in the set top box ex217 connected to a cable ex203 for a cable television or an antenna ex204 for satellite and/or terrestrial broadcasting, so as to reproduce the video signals on the monitor ex219 of the television ex300. The image decoding apparatus may be included not in the set top box but in the television ex300. Also, a car ex210 having an antenna ex205 can receive signals from the satellite ex202 or the base station ex201 for reproducing video on a display device such as a car navigation system ex211 set in the car ex210.

Furthermore, the image decoding apparatus or the image coding apparatus as shown in Embodiment 1 can be implemented in the reader/recorder ex218 (i) for reading and decoding the video data, the audio data, or the coded bitstream obtained by multiplexing the video data and the audio data, or (ii) for coding the video data, the audio data, or the coded bitstream obtained by multiplexing the video data and the audio data and recording the resulting data as the multiplexed data on the recording medium ex215. Here, the video data and the audio data are recorded on the recording medium ex215, such as a BD and a DVD. In this case, the reproduced video signals are displayed on the monitor ex219. Furthermore, the reproduced video signals can be reproduced by another device or system, using the recording medium ex215 on which the coded bitstream is recorded. For example, another reproduction apparatus ex212 can reproduce the video signals on a monitor ex213, using a recording medium ex214 on which the coded bitstream is copied.

Furthermore, it is also possible to implement the image decoding apparatus in the set top box ex217 connected to the cable ex203 for a cable television or the antenna ex204 for satellite and/or terrestrial broadcasting, so as to reproduce the video signals on the monitor ex219 of the television ex300. The image decoding apparatus may be included not in the set top box but in the television ex300.

Figure 19:
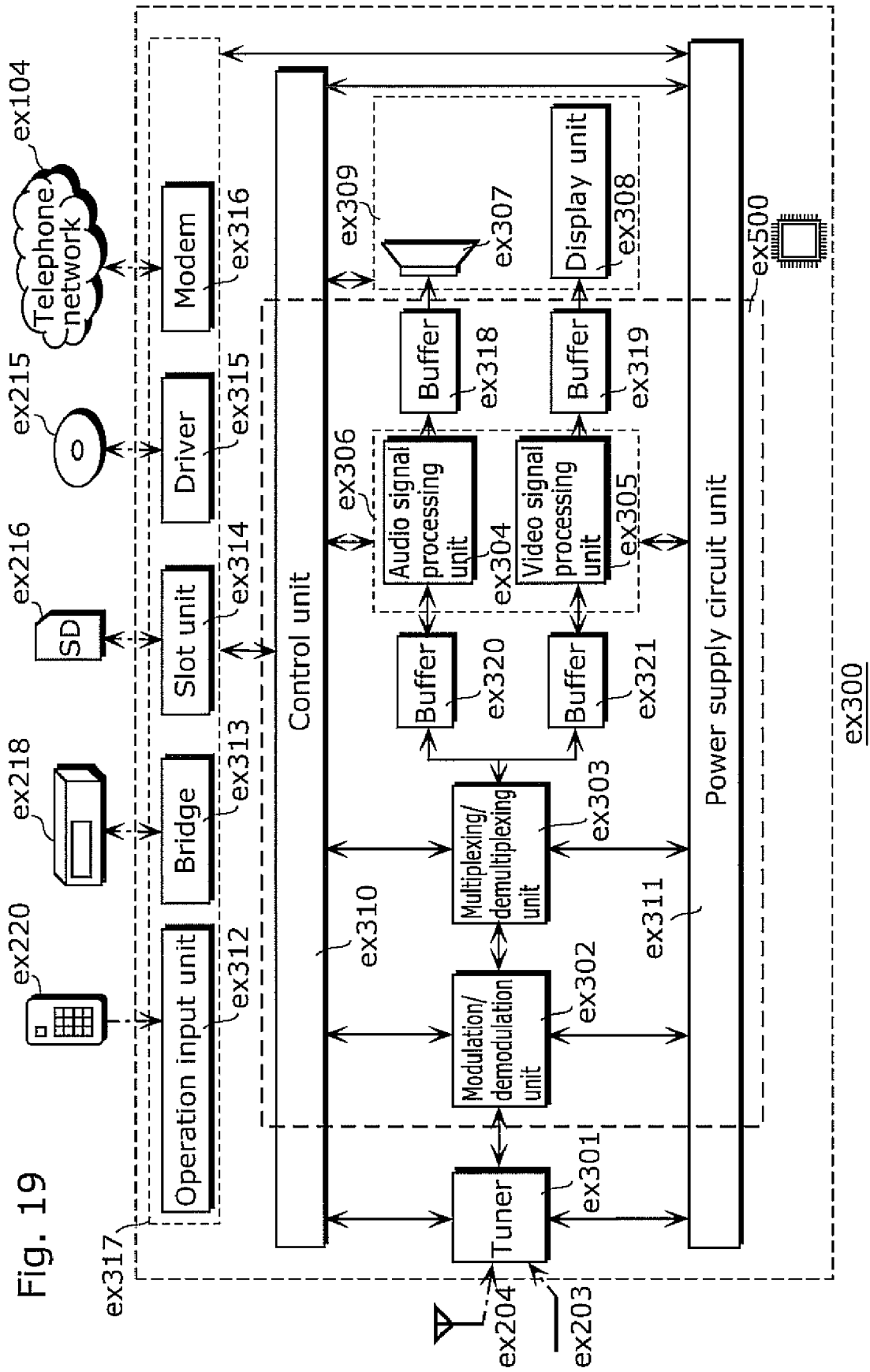
FIG. 19 is a block diagram showing an example of a configuration of a television.

FIG. 19 illustrates the television (receiver) ex300 that uses the image coding method and the image decoding method described in Embodiment 1. The television ex300 includes: a tuner ex301 that obtains or provides a bitstream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. The television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, a configuration will be described in which the television ex300 decodes data obtained from outside through the antenna ex204 and others and reproduces the decoded data. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in Embodiment 1, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disk, and an SD card. Next, a configuration will be described in which the television ex300 codes an audio signal and a video signal, and transmits the data outside or writes the data on a recording medium. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in Embodiment 1. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the so modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of coding, multiplexing, and providing outside data but capable of only one of receiving, decoding, and providing outside data.

Furthermore, when the reader/recorder ex218 reads or writes a coded bitstream from or in a recording medium, one of the television ex300 and the reader/recorder ex218 may decode or code the coded bitstream, and the television ex300 and the reader/recorder ex218 may share the decoding or coding.

Figure 20:
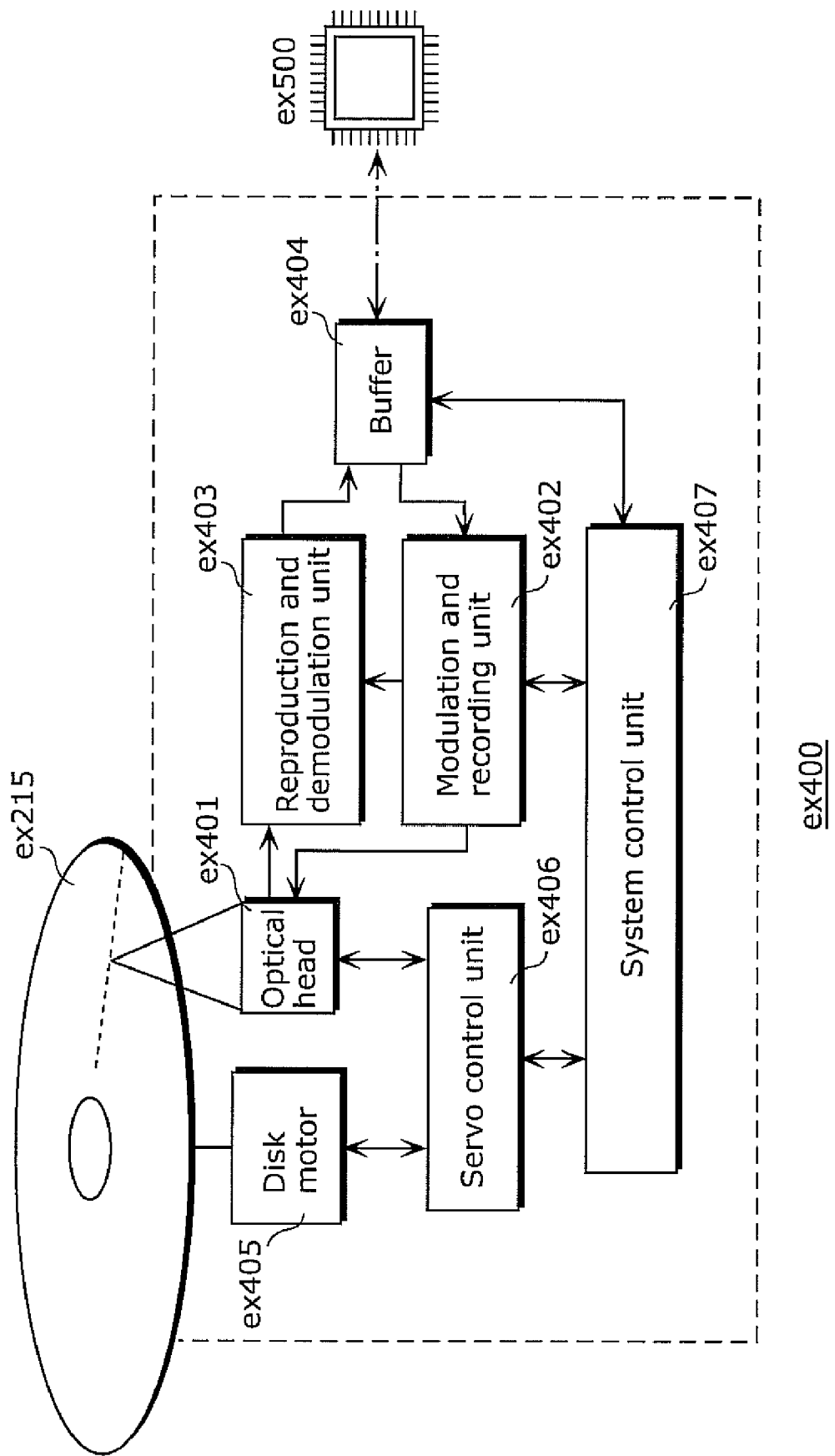
FIG. 20 is a block diagram showing an example of a configuration of an information reproducing and recording unit that reads and writes information from and on a recording medium that is an optical disk.

As an example, FIG. 20 illustrates a configuration of an information reproducing/recording unit ex400 when data is read or written from or in an optical disk. The information reproducing/recording unit ex400 includes constituent elements ex401 to ex407 to be described hereinafter. The optical head ex401 irradiates a laser spot on a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
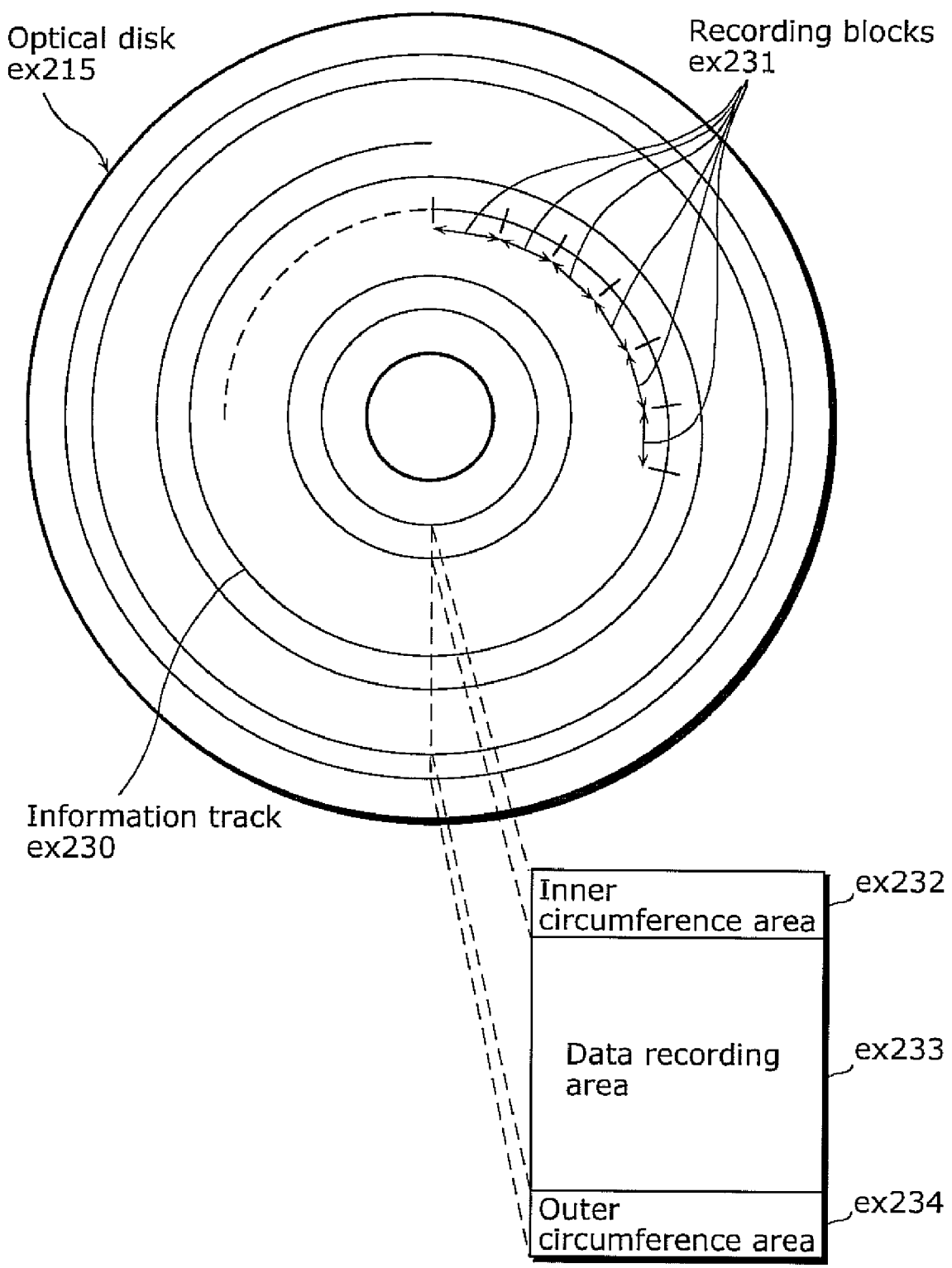
FIG. 21 shows an example of a configuration of a recording medium that is an optical disk.

FIG. 21 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the image coding method and the image decoding method in Embodiment 1 can be used in any of the devices and systems described. Thus, the advantages described in Embodiment 1 can be obtained.

Furthermore, the present invention is not limited to Embodiments, and various modifications and revisions are possible without departing from the scope of the present invention.

Embodiment 5

Figure 22:
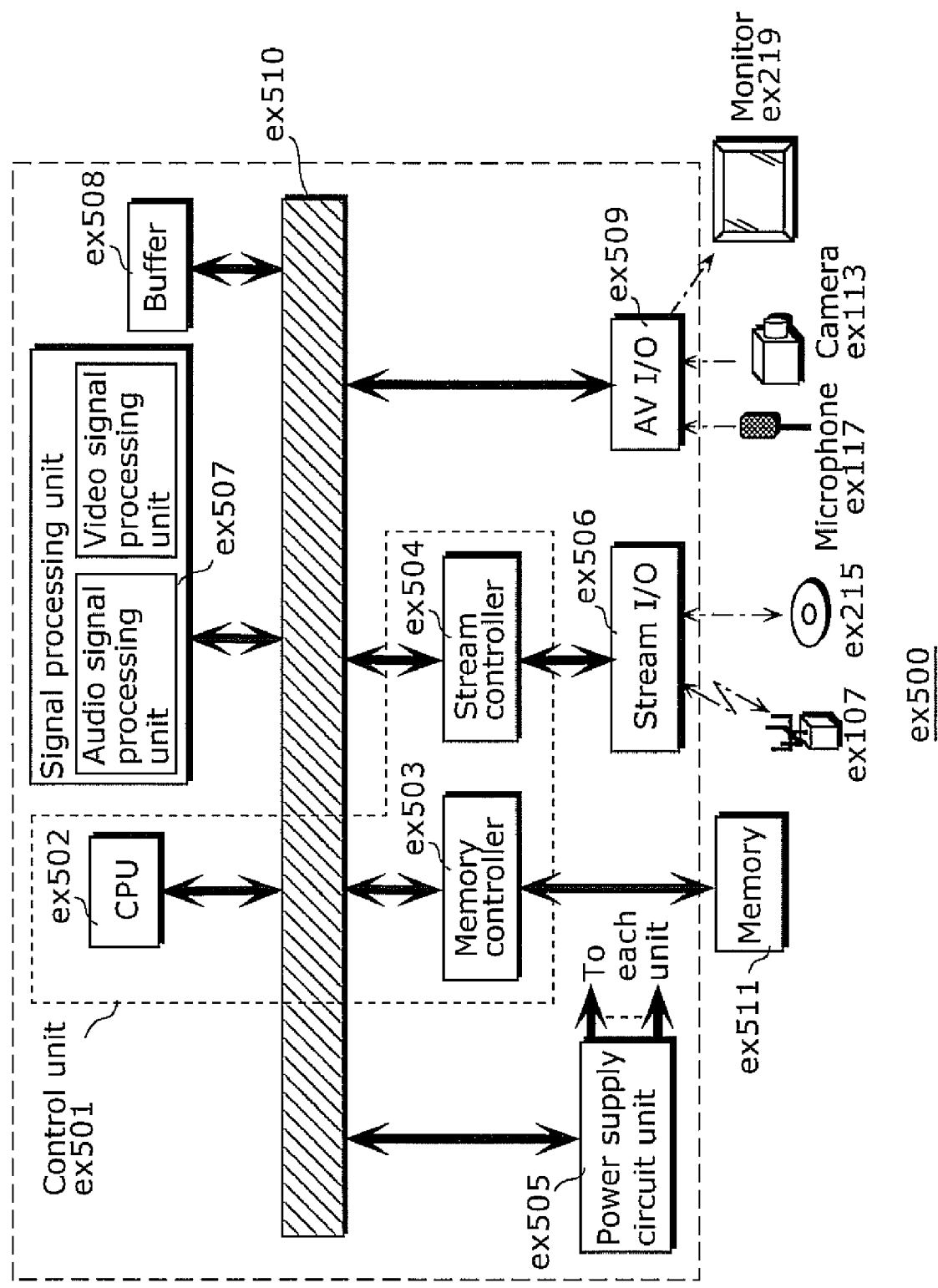
FIG. 22 is a block diagram showing an example of a configuration of an integrated circuit for implementing the image coding method and the image decoding method according to each of Embodiments.

Each of the image coding method, the image coding apparatus, the image decoding method, and the image decoding apparatus in each of Embodiments is typically achieved in the form of an integrated circuit or a Large Scale Integrated (LSI) circuit. As an example of the LSI, FIG. 22 illustrates a configuration of the LSI ex500 that is made into one chip. The LSI ex500 includes elements ex501 to ex509 to be described below, and the elements are connected to each other through a bus ex510. The power supply circuit unit ex505 is activated by supplying each of the elements with power when power is on.

For example, when coding is performed, the LSI ex500 receives an AV signal from a microphone ex117, a camera ex113, and others through an AV IO ex509 under control of a control unit ex501 including a CPU ex502, a memory controller ex503, and a stream controller ex504. The received AV signal is temporarily stored in a memory ex511 outside the LSI ex500, such as an SDRAM. Under control of the control unit ex501, the stored data is subdivided into data portions according to the processing amount and speed as necessary. Then, the data portions are transmitted to a signal processing unit ex507. The signal processing unit ex507 codes an audio signal and/or a video signal. Here, the coding of the video signal is the coding described in Embodiments. Furthermore, the signal processing unit ex507 sometimes multiplexes the coded audio data and the coded video data, and a stream I/O ex506 provides the multiplexed data outside. The provided bitstream is transmitted to a base station ex107, or written on the recording medium ex215. When data sets are multiplexed, the data sets should be temporarily stored in the buffer ex508 so that the data sets are synchronized with each other.

For example, when coded data is decoded, the LSI ex500 temporarily stores, in the memory ex511, the coded data obtained from the base station ex107 through the stream I/O ex506 or read from the recording medium ex215 under control of the control unit ex501. Under control of the control unit ex501, the stored data is subdivided into data portions according to the processing amount and speed as necessary. Then, the data portions are transmitted to the signal processing unit ex507. The signal processing unit ex507 decodes audio data and/or video data. Here, the decoding of the video signal is the decoding described in Embodiments. Furthermore, a decoded audio signal and a decoded video signal may be temporarily stored in the buffer ex508 and others so that the signals can be reproduced in synchronization with each other. Each of the output units, such as the cellular phone ex114, the game machine ex115, and the television ex300 provides the decoded output signal through, for example, the memory 511 as necessary.

Although the memory ex511 is an element outside the LSI ex500 in the description, it may be included in the LSI ex500. The buffer ex508 is not limited to one buffer, but may be composed of buffers. Furthermore, the LSI ex500 may be made into one chip or a plurality of chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A Field Programmable Gate Array (FPGA) that is programmable after manufacturing an LSI or a reconfigurable processor allowing reconfiguration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

Although the coding method, the coding apparatus, the decoding method, and the decoding apparatus according to the present invention have been described based on the exemplary Embodiments, the present invention is not limited to the Embodiments. Those skilled in the art will readily appreciate that many modifications are possible in the exemplary Embodiments without materially departing from the novel teachings and advantages of the present invention. Accordingly, all such modifications and other embodiments conceivable by arbitrarily combining the structural elements and/or steps of different embodiments are intended to be included within the scope of the present invention.

INDUSTRIAL APPLICABILITY

The present invention can be implemented as an image coding method, an image decoding method, an image coding apparatus, and an image decoding apparatus, and is applicable to, for example, an image recording apparatus, an image reproduction apparatus, and the like.

What is claimed is:

1. An image decoding method of decoding a multiview video, comprising:
    parsing NAL units including an image included in view components of a base view;
    decoding the image included in the view components of the base view;
    parsing NAL unit header MVC extension parameters of a non-base view;
    searching the view components of the base view for prefix NAL units;
    computing NAL unit header MVC extension parameters for the base view when no prefix NAL units are present in the view components of the base view;
    parsing, when prefix NAL units are present in the view components of the base view, the NAL unit header MVC extension parameters of the base view, with reference to the prefix NAL units;
    parsing NAL units including an image included in view components of the non-base view; and
    decoding the image included in the view components of the non-base view, using (i) the computed or parsed NAL unit header MVC extension parameters of the base view and (ii) the parsed NAL unit header MVC extension parameters of the non-base view.

2. An image decoding apparatus which decodes a multiview video, comprising:
    a base view NAL unit parsing unit configured to parse NAL units including an image included in view components of a base view;
    a base view decoding unit configured to decode the image included in the view components of the base view;
    a non-base view MVC extension parameter parsing unit configured to parse NAL unit header MVC extension parameters of a non-base view;
    a prefix NAL unit searching unit configured to search the view components of the base view for prefix NAL units;
    a base view MVC extension parameter computation unit configured to compute NAL unit header MVC extension parameters for the base view when no prefix NAL units are present in the view components of the base view;

a base view MVC extension parameter parsing unit configured to parse, when prefix NAL units are present in the view components of the base view, the NAL unit header MVC extension parameters of the base view, with reference to the prefix NAL units;

a non-base view NAL unit parsing unit configured to parse NAL units including an image included in view components of the non-base view; and a non-base view decoding unit configured to decode the image included in the view components of the non-base view, using (i) the computed or parsed NAL unit header MVC extension parameters of the base view and (ii) the parsed NAL unit header MVC extension parameters of the non-base view.

* * * * *